(12) United States Patent
Nakagawa et al.

(10) Patent No.: US 11,276,282 B2
(45) Date of Patent: Mar. 15, 2022

(54) INFORMATION PROCESSING APPARATUS, INFORMATION PROCESSING METHOD, AND RECORDING MEDIUM

(71) Applicant: SONY CORPORATION, Tokyo (JP)

(72) Inventors: Ayumi Nakagawa, Kanagawa (JP); Ryo Yokoyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/973,527

(22) PCT Filed: Jun. 18, 2019

(86) PCT No.: PCT/JP2019/024001
§ 371 (c)(1),
(2) Date: Dec. 9, 2020

(87) PCT Pub. No.: WO2020/008856
PCT Pub. Date: Jan. 9, 2020

(65) Prior Publication Data
US 2021/0256821 A1     Aug. 19, 2021

(30) Foreign Application Priority Data

Jul. 2, 2018 (JP) .............................. JP2018-126043

(51) Int. Cl.
*G08B 6/00* (2006.01)
*G06F 3/01* (2006.01)

(52) U.S. Cl.
CPC ................. *G08B 6/00* (2013.01); *G06F 3/01* (2013.01); *G06F 3/016* (2013.01)

(58) Field of Classification Search
CPC .............. G08B 6/00; G06F 3/016; G06F 3/01
(Continued)

(56) References Cited

U.S. PATENT DOCUMENTS 6,198,395 B1 * 3/2001 Sussman ................... A61F 9/08
                                                        340/407.1
6,392,540 B1 * 5/2002 Brown ...................... G08B 1/08
                                                        340/407.1
(Continued)

FOREIGN PATENT DOCUMENTS

JP      2012-187148 A     10/2012
JP      2015-231098 A     12/2015
(Continued)

*Primary Examiner* — John A Tweel, Jr.
(74) *Attorney, Agent, or Firm* — Paratus Law Group, PLLC

(57) ABSTRACT

The present disclosure relates to an information processing apparatus, an information processing method, and a recording medium that allow tactile presentation corresponding to content to be assigned to a device. A control unit controls, on the basis of content information regarding content presented to a user and device information regarding a plurality of devices that the user is carrying, each device having a tactile presentation unit that presents a tactile sensation to the user, output of a tactile signal for causing at least one of the plurality of devices having the tactile presentation units to make the tactile presentation unit present a tactile sensation corresponding to the content. The present disclosure can be applied to, for example, a tactile presentation control device.

19 Claims, 22 Drawing Sheets

(58) Field of Classification Search
USPC .................................................... 340/407.1
See application file for complete search history.

(56) References Cited

U.S. PATENT DOCUMENTS

2017/0353570 A1* 12/2017 Hayashi ................ H04W 84/20
2017/0364143 A1* 12/2017 Danieau ................ G06F 3/011
2019/0196596 A1*  6/2019 Yokoyama ............. G06F 3/016

FOREIGN PATENT DOCUMENTS

| | | |
|---|---|---|
| JP | 2016-131306 A | 7/2016 |
| JP | 2017-227780 A | 12/2017 |
| JP | 2018-501575 A | 1/2018 |
| WO | WO 2018/008217 A1 | 1/2018 |

* cited by examiner

FIG. 16
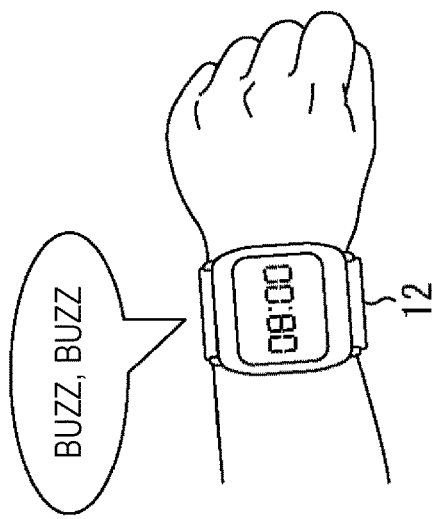
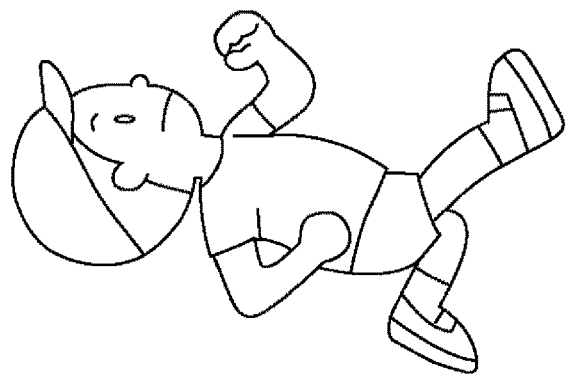

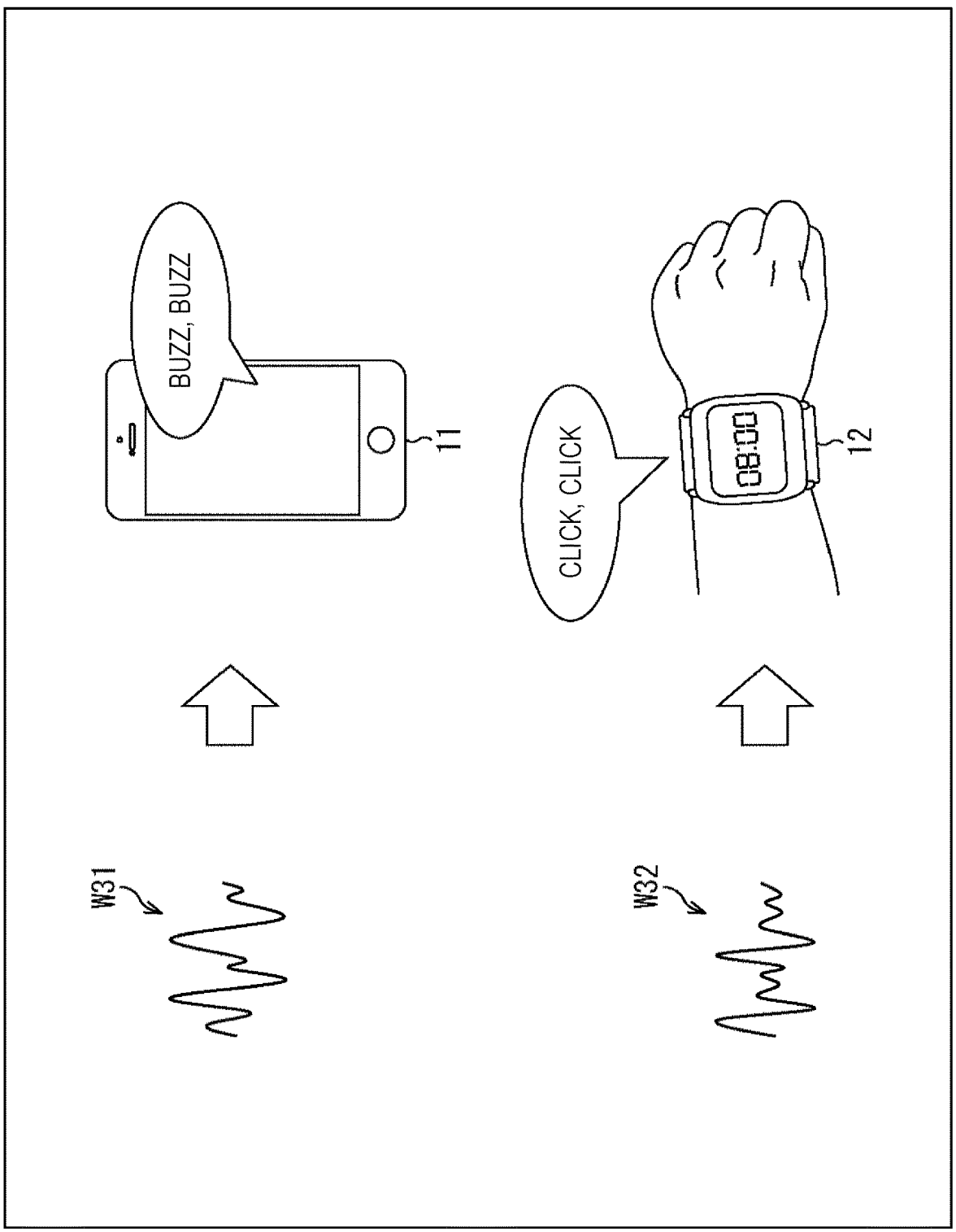

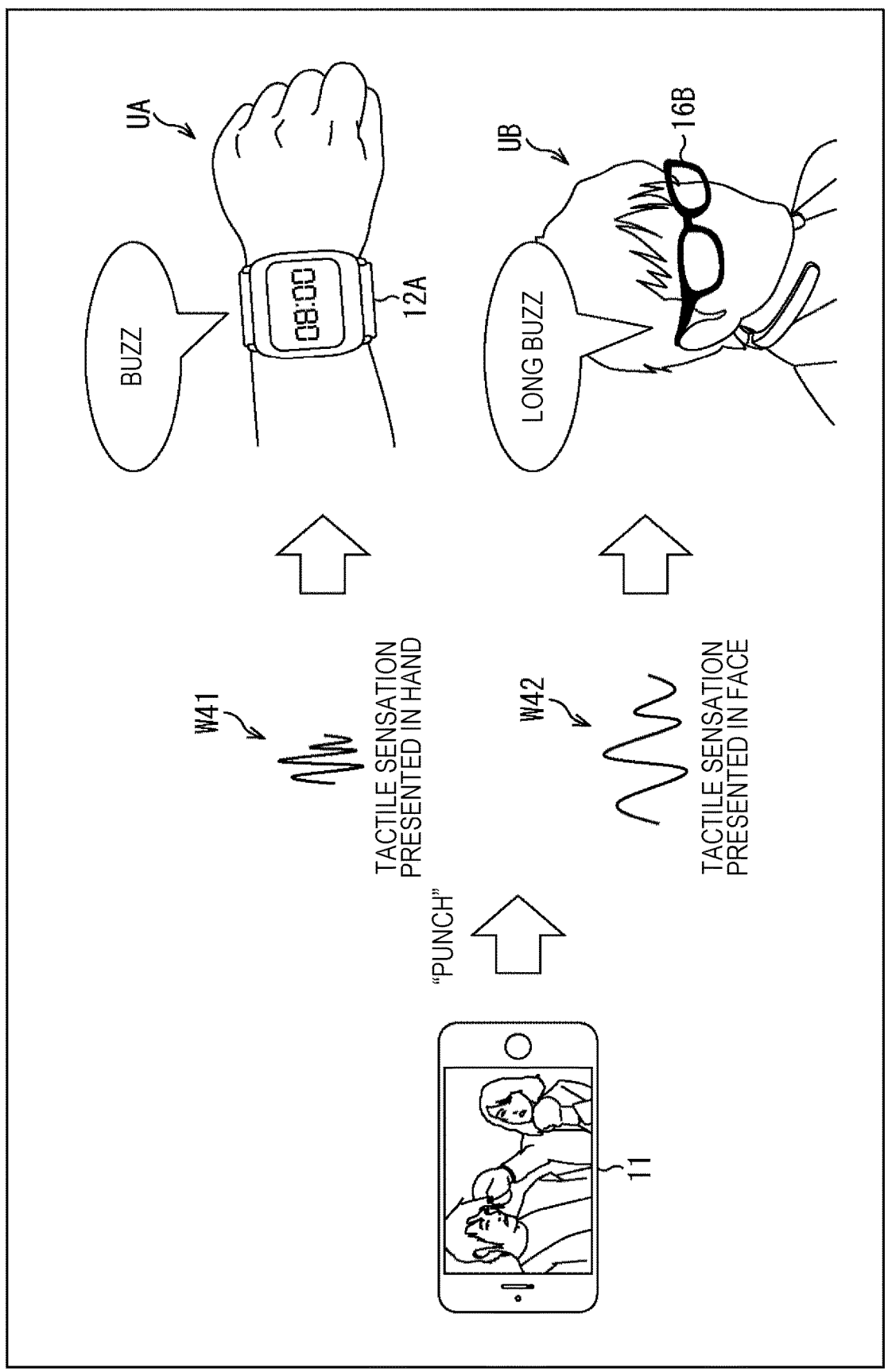

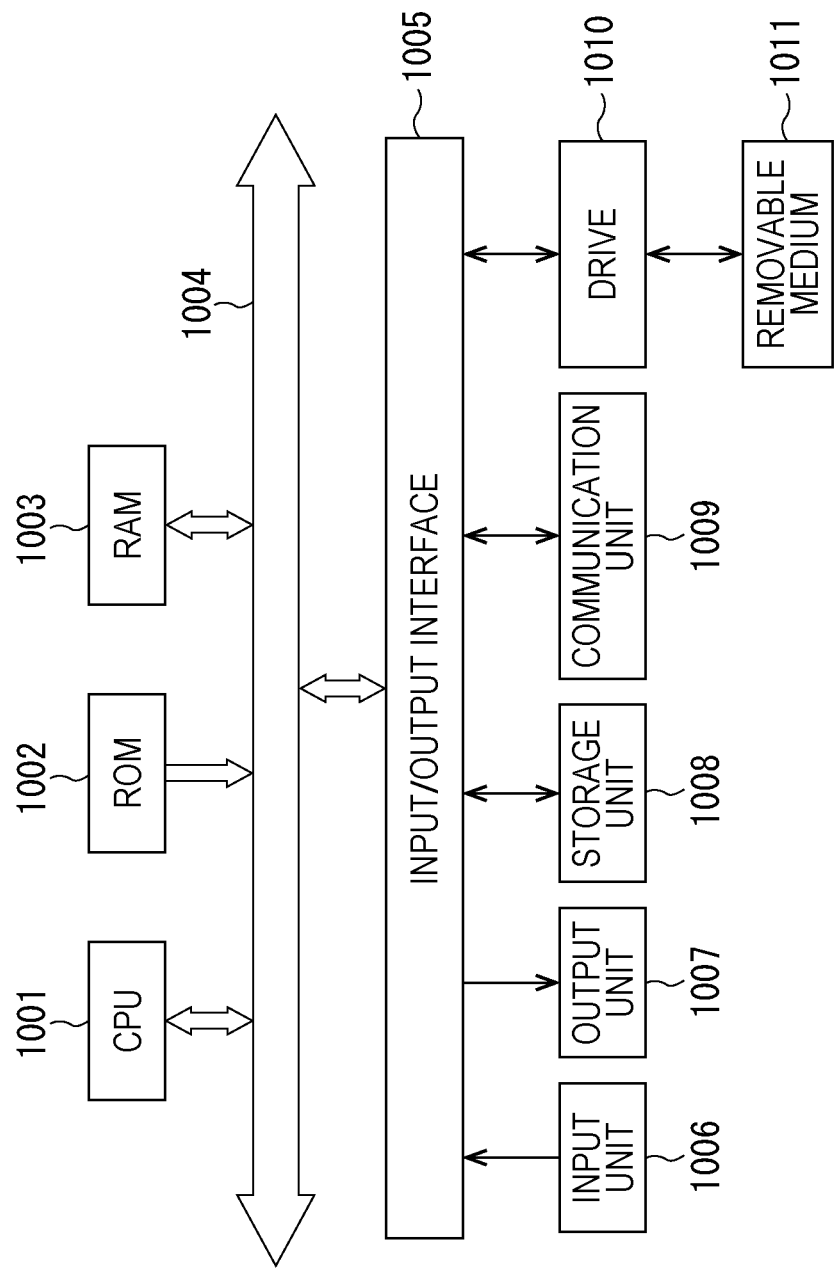

INFORMATION PROCESSING APPARATUS, INFORMATION PROCESSING METHOD, AND RECORDING MEDIUM

CROSS REFERENCE TO PRIOR APPLICATION

This application is a National Stage Patent Application of PCT International Patent Application No. PCT/JP2019/024001 (filed on Jun. 18, 2019) under 35 U.S.C. § 371, which claims priority to Japanese Patent Application No. 2018-126043 (filed on Jul. 2, 2018), which are all hereby incorporated by reference in their entirety.

TECHNICAL FIELD

The present disclosure relates to an information processing apparatus, an information processing method, and a recording medium, and more particularly to an information processing apparatus, an information processing method, and a recording medium that allow tactile presentation corresponding to content to be assigned to a device.

BACKGROUND ART

Conventionally, in order to enhance immersive feeling and realistic feeling for content such as moving images, music, and games, a technique has been used in which an actuator is built into a mobile device or a controller for viewing or playing those pieces of content so that vibration is fed back to a user.

For example, Patent Document 1 discloses a vibrating device than vibrates a grip portion protruding from a device holding portion that fixes and holds a mobile device such as a portable game machine or a smartphone, in accordance with sound from the mobile device. A user who is operating the mobile device while gripping the grip portion can get a sense of vibration synchronized with the sound from the mobile device.

Incidentally in recent years, users wear a plurality of devices that presents vibrations, such as a smartphone and a watch-type and jacket-type wearable terminals is some cases. In a situation where a user is wearing a plurality of such devices, there is an optimum vibration pattern depending on characteristics of a device and a part of the user's body where toe device is worn.

CITATION LIST

Patent Document

Patent Document 1: Japanese Patent Application Laid-Open No. 2015-231098

SUMMARY OF THE INVENTION

Problems to be Solved by the Invention

There has conventionally been a technique for individually controlling a plurality of vibrators arranged in one device, each of the vibrators having different characteristics. However, is a case where a user is wearing a plurality of devices that presents tactile sensations, it has not been possible to assign tactile presentation corresponding to content presented to the user to a device most suitable for the tactile presentation.

The present disclosure has been made in view of such a situation, and is intended to allow tactile presentation corresponding to content to be assigned to the most suitable device.

Solutions to Problems

An information processing apparatus of the present disclosure includes a control unit that controls, on the basis of content information regarding content presented to a user and device information regarding a plurality of devices that the user is carrying each device having a tactile presentation unit that presents a tactile sensation to the user, output of a tactile signal for causing at least one of the plurality of devices having the tactile presentation units to make the tactile presentation unit present a tactile sensation corresponding to the content.

An information processing method of the present disclosure includes controlling, by an information processing apparatus, on the basis of content information regarding content presented to a user and device information regarding a plurality of devices that the user is carrying, each device having a tactile presentation unit that presents a tactile sensation to the user, output of a tactile signal for causing at least one of the plurality of devices having the tactile presentation units to make the tactile presentation unit present a tactile sensation corresponding to the content.

A recording medium of the present disclosure is a recording medium on which a program is recorded, the program being for causing a computer to execute processing of controlling, on the basis of content information regarding content presented to a user and device information regarding a plurality of devices that the user is carrying, each device having a tactile presentation unit that presents a tactile sensation to the user, output of a tactile signal for causing at least one of the plurality of devices having the tactile presentation units to make the tactile presentation unit present a tactile sensation corresponding to the content.

In the present disclosure, on the basis of content information regarding content presented to a user and device information regarding a plurality of devices that the user is carrying, each device having a tactile presentation unit that presents a tactile sensation to the user, output of a tactile signal for causing at least one of the plurality of devices having the tactile presentation units to make the tactile presentation unit present a tactile sensation corresponding to the content is controlled.

Effects of the Invention

According to the present disclosure, it is possible to assign tactile presentation corresponding to content to the most suitable device.

Note that the effects described here are not necessarily restrictive, and the effects of the invention may be any one of the effects described in the present disclosure.

BRIEF DESCRIPTION OF DRAWINGS

FIG. 16 is a diagram illustrating an example of determining a device in accordance with a user's behavior.

FIG. 20 is a diagram illustrating an example of assigning tactile presentation to a plurality of devices.

FIG. 21 is a diagram illustrating an example of assigning tactile presentation to a plurality of devices.

FIG. 22 is a block diagram illustrating a configuration example of a computer.

MODE FOR CARRYING OUT THE INVENTION

A mode for carrying out the present disclosure (hereinafter referred to as an "embodiment") will be described below. Note that the description will be made in the order below.

1. Outline of tactile presentation according to embodiment of present disclosure
2. Configuration and operation of tactile presentation system
3. Determining device to present tactile sensation
4. Assignment of tactile presentation to plurality of devices
5. Others 1. Outline of Tactile Presentation According to Embodiment of Present Disclosure A tactile presentation system to which the technique according to the present disclosure is applied optimally assigns tactile presentation corresponding to content presented to a user to a plurality of tactile presentation devices carried by the user.

In the following, an example in which a sense of vibration is presented (hereinafter referred to as vibration presentation) as tactile presentation to a user will be described.

Figure 1:
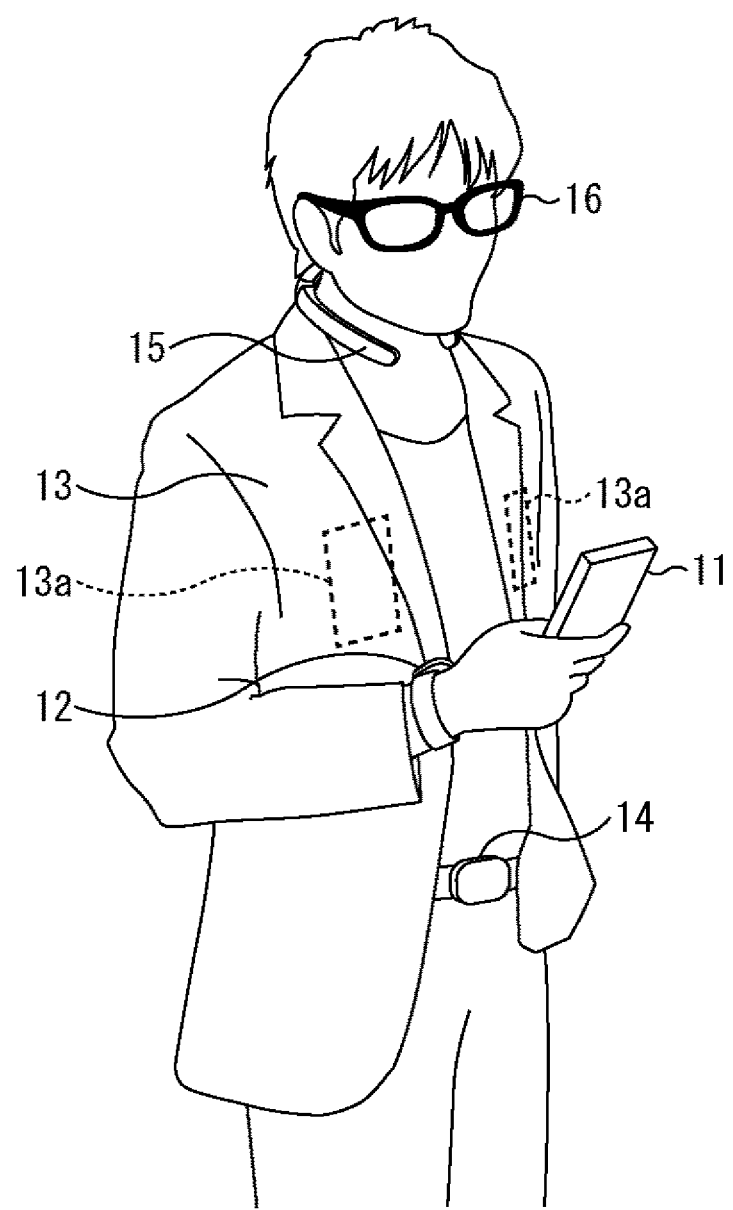
FIG. 1 is a diagram illustrating an outline of tactile presentation according to an embodiment of the present disclosure.

FIG. 1 is a diagram illustrating an example of a plurality of tactile presentation devices that present vibrations.

As illustrated in FIG. 1, a user carries, as the plurality of tactile presentation devices, a smartphone 11, a watch-type device 12, a jacket-type device 13, a belt-type device 14, a collar-type device 15, and a glasses-type device 16.

Here, "carrying" includes, not only a user gripping something with a hand, but also wearing something on a part of the body such as a hand, head, neck, waist, or foot, and, for example, being temporarily in contact with something.

Each of the tactile presentation devices carried by the user (hereinafter also referred to simply as a device) has a vibrator as a tactile presentation unit inside thereof. For example, the jacket-type device 13 includes vibrators 13a and 13b at positions corresponding to the left and right sides of the user's chest, and includes a vibrator (not illustrated) at a position corresponding to the user's back. Each vibrator is constituted by, for example, an actuator, and vibrates itself to vibrate a device, thereby presenting a vibration to the user. Each device may include a plurality of vibrators, or may include one vibrator.

The vibrator of each device vibrates in synchronization with content presented to the user. This content is, for example, a moving image, music, or a game that visually or aurally appeals to the user, together with vibration presentation. In the example in FIG. 1, the user is viewing a moving image presented by the smartphone 11.

Such content that visually appeals to a user may be presented by a terminal or a display other than the smartphone 11, a television receiver, a display device for virtual reality (VR) or augmented reality (AR), or the like. Furthermore, in a case of content that aurally appeals to a user, the content is presented by headphones, earphones, a speaker, or the like. As a matter of course, content that appeals both visually and aurally to a user is presented by a device that enables both visual presentation and aural presentation.

At this time, in an embodiment of the present disclosure, vibration presentation corresponding to a moving image being viewed by a user is assigned to the most suitable device in accordance with contents of the moving image, characteristics of the vibrators included in the devices, or the like.

Figure 2:
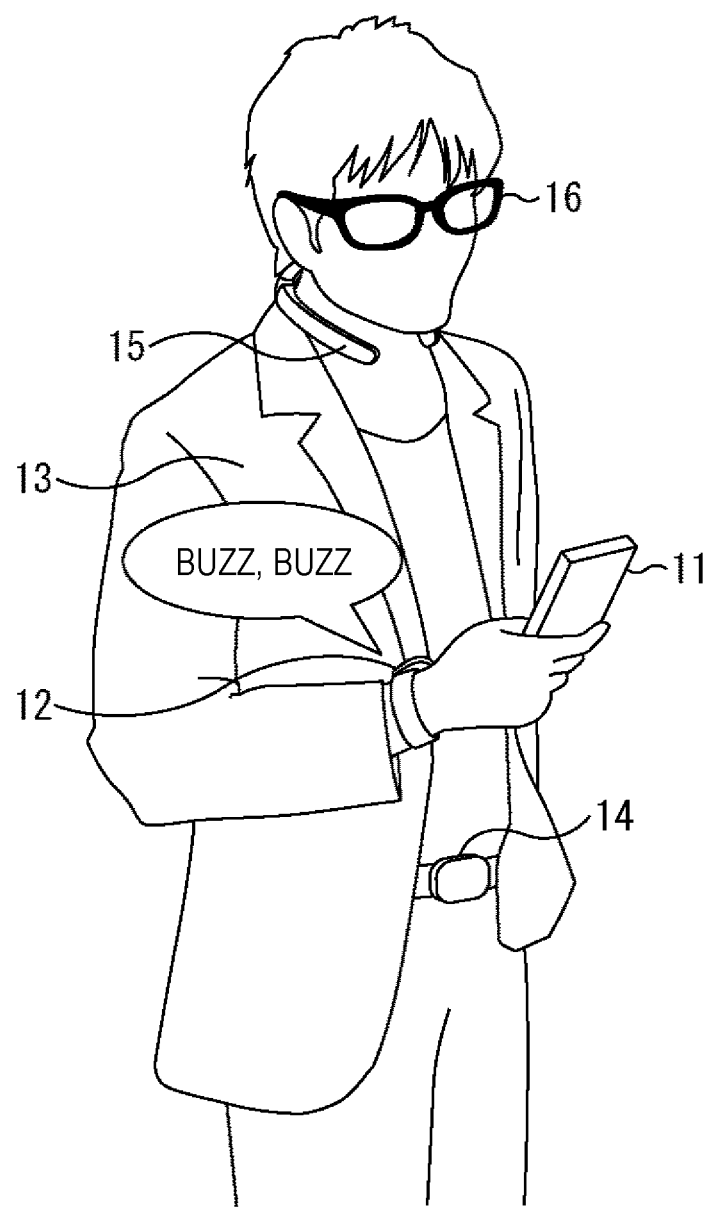
FIG. 2 is a diagram illustrating an example of tactile presentation.

For example, in a case where the characteristics of the vibrator included in the watch-type device 12 are most suitable for vibration presentation corresponding to a moving image, the vibration presentation is assigned to the vibrator of the watch-type device 12 as illustrated in FIG. 2, and the watch-type device 12 vibrates. Characteristics of a vibrator include a frequency characteristic, an acceleration (intensity) characteristic, and a time response characteristic of vibration, loudness of chattering noise, and the like.

Figure 3:
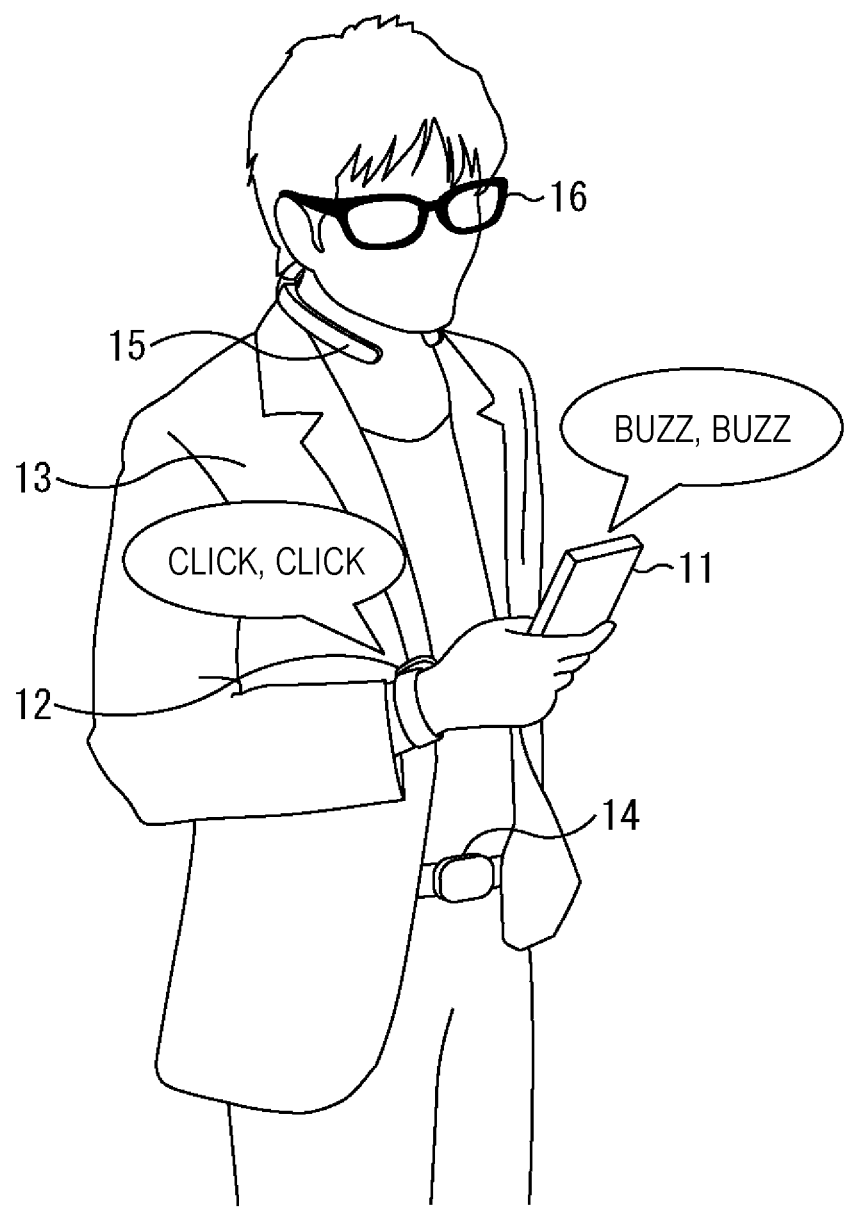
FIG. 3 is a diagram illustrating an example of tactile presentation.

Furthermore, it is also possible to allow vibration presentation corresponding to a moving image being viewed by a user to be assigned to a plurality of devices as illustrated in FIG. 3. In the example in FIG. 3, vibration presentation is assigned to each vibrator of the smartphone 11 and the watch-type device 12, and the smartphone 11 and the watch-type device 12 are vibrating.

Vibration presentation may be assigned to a plurality of devices on the basis of information regarding the assignment added as metadata to content, or on the basis of the characteristics of the vibrator of each device.

A specific configuration and operation for achieving the tactile presentation system described above will be described below.

2. Configuration and Operation of Tactile Presentation System (Configuration of Tactile Presentation System)

Figure 4:
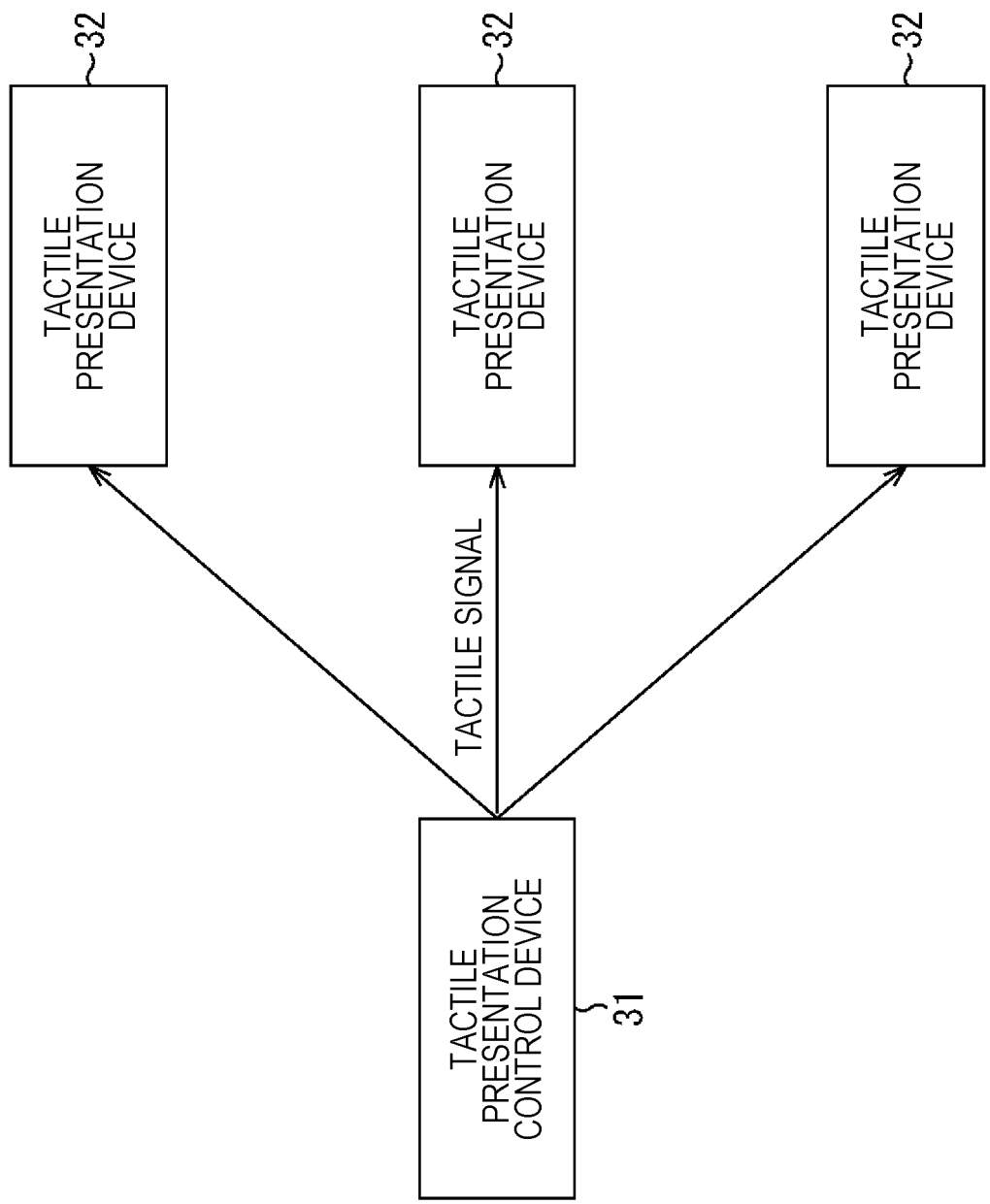
FIG. 4 is a block diagram illustrating a configuration example of a tactile presentation system.

FIG. 4 is a block diagram illustrating a configuration example of the tactile presentation system according to the embodiment of the present disclosure.

The tactile presentation system in FIG. 4 is constituted by a tactile presentation control device 31 and three tactile presentation devices 32. In FIG. 4, the three tactile presentation devices 32 are illustrated, but the number of the tactile presentation devices 32 is not limited to this.

The tactile presentation control device 31 is an information processing apparatus to which the technique according to the present disclosure is applied. The tactile presentation control device 31 detects each of the tactile presentation devices 32, and outputs, to the tactile presentation devices 32, a tactile signal for tactile presentation corresponding to content presented to a user.

The tactile presentation devices 32 present tactile sensations on the basis of the tactile signal from the tactile presentation control device 31. That is, the tactile presentation devices 32 correspond to the devices in FIG. 1.

On the other hand, the tactile presentation control device 31 may be a server connected to the tactile presentation devices 32 via a network such as the Internet, or the tactile presentation control device 31 itself may be a device that presents a tactile sensation (e.g., the smartphone 11 in FIG. 1 or a portable game machine (not illustrated)).

It is only required that the tactile presentation system according to the embodiment of the present disclosure include a plurality of tactile presentation devices. Thus, in a case where the tactile presentation control device 31 itself is configured as a device that presents a tactile sensation, a minimum configuration of the tactile presentation system according to the embodiment of the present disclosure is a configuration constituted by the tactile presentation control device 31 and one tactile presentation device 32.

The tactile presentation control device 31 may detect the tactile presentation device 32 by a Bluetooth (registered trademark) connection, a proximity sensor, or the Internet of Things (IoT) that enables a so-called smart home.

Figure 5:
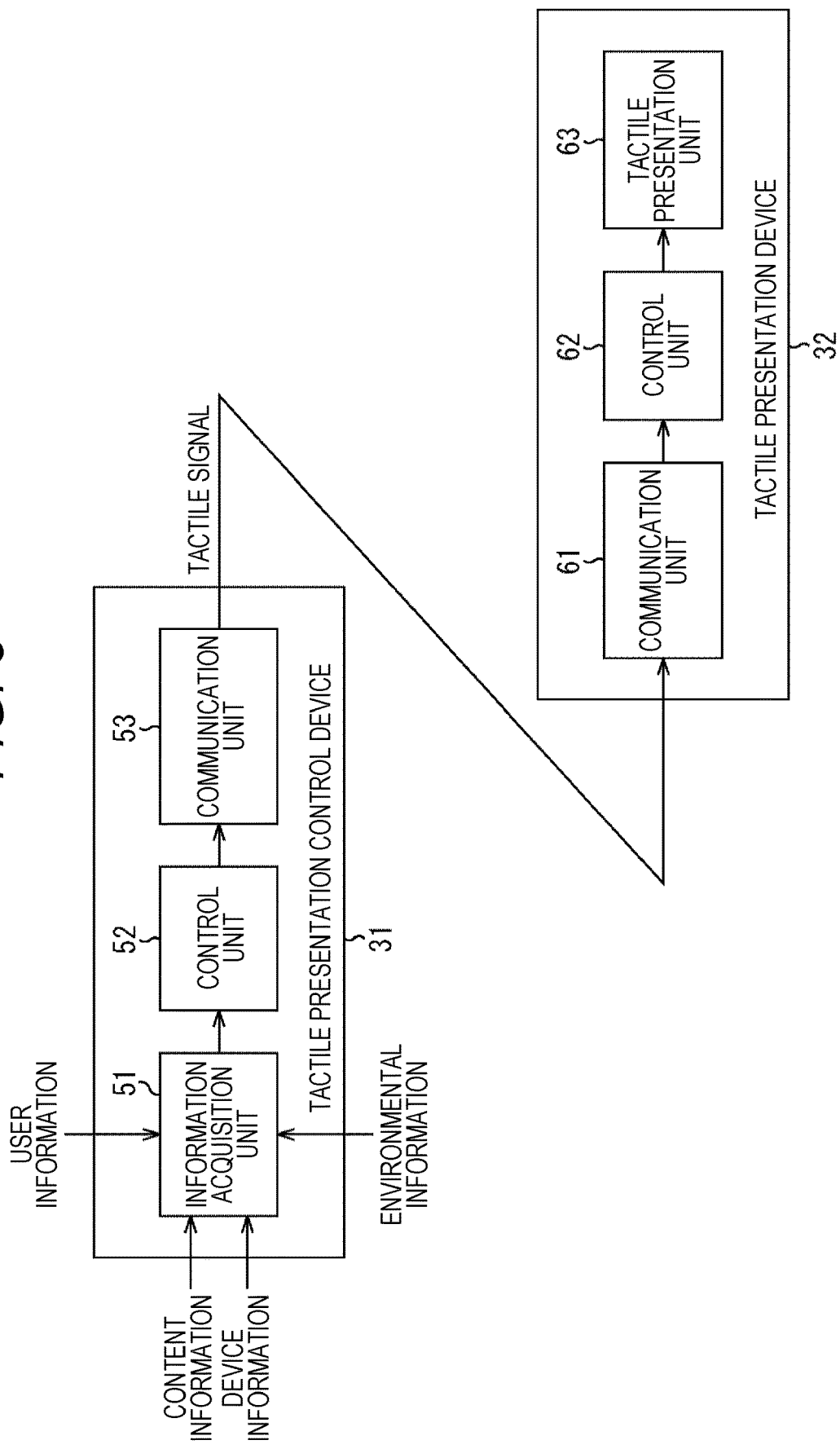
FIG. 5 is a block diagram illustrating a functional configuration example of the tactile presentation system.

FIG. 5 is a block diagram illustrating a functional configuration example of the tactile presentation control device 31 and the tactile presentation device 32.

As illustrated in FIG. 5, the tactile presentation control device 31 includes an information acquisition unit 51, a control unit 52, and a communication unit 53.

The information acquisition unit 51 acquires information output from a device that presents content to a user, the detected tactile presentation device 32, various sensors such as an acceleration sensor and a gyro sensor, and the like. Specifically, the information acquisition unit 51 acquires content information, device information, user information, and environmental information, and supplies the pieces of information to the control unit 52.

As will be described later in detail, the content information is information regarding content presented to the user, and the device information is information regarding each of the tactile presentation devices 32. The user information is information regarding the user carrying each of the tactile presentation devices 32, and the environmental information is information regarding an environment around each of the tactile presentation devices 32.

The control unit 52 controls output of a tactile signal (in this example, a vibration signal for vibrating the tactile presentation devices 32) to cause at least one of a plurality of the tactile presentation devices 32 to present a tactile sensation corresponding to the content presented to the user, on the basis of the pieces of information from the information acquisition unit 51.

Figure 6:
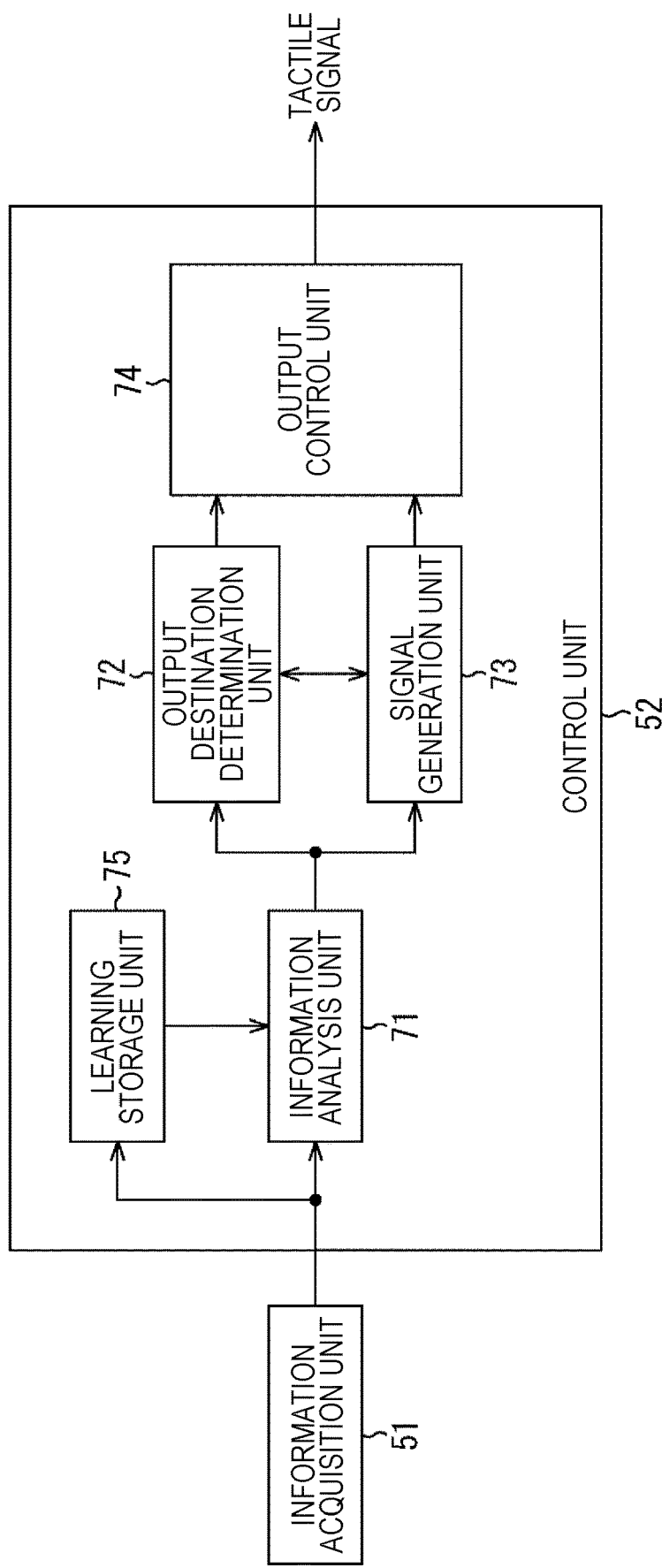
FIG. 6 is a block diagram illustrating a functional configuration example of a control unit.

Here, a detailed functional configuration example of the control unit 52 will be described with reference to FIG. 6.

The control unit 52 includes an information analysis unit 71, an output destination determination unit 72, a signal generation unit 73, an output control unit 74, and a learning storage unit 75.

The information analysis unit 71 integrates and analyzes the pieces of information from the information acquisition unit 51, and supplies a result of the analysis to the output destination determination unit 72 and the signal generation unit 73.

The output destination determination unit 72 determines the tactile presentation device 32 to be an output destination of the tactile signal on the basis of the analysis result from the information analysis unit 71 and the pieces of information used in the analysis, and supplies the output control unit 74 with information indicating the tactile presentation device 32. Note that the number of tactile presentation devices 32 to be the output destination of the tactile signal may be one, or may be two or more.

The signal generation unit 73 generates a tactile signal on the basis of the analysis result from the information analysis unit 71 and supplies it to the output control unit 74.

The output control unit 74 controls the communication unit 53 so that the tactile signal from the signal generation unit 73 is output to the tactile presentation device 32 indicated by the information from the output destination determination unit 72.

On the basis of the user information among the pieces of information from the information acquisition unit 51, the learning storage unit 75 learns the user information acquired when a tactile sensation is presented by the tactile presentation device 32, and stores a result of the learning.

Returning to the description of FIG. 5, the communication unit 53 transmits the tactile signal to the tactile presentation device 32 on the basis of the control by the control unit 52 (output control unit 74).

On the other hand, the tactile presentation device 32 includes a communication unit 61, a control unit 62, and a tactile presentation unit 63.

The communication unit 61 receives a tactile signal from the tactile presentation control device 31 on the basis of control by the control unit 62.

The control unit 62 inputs the tactile signal received by controlling the communication unit 61 to the tactile presentation unit 63.

The tactile presentation unit 63 presents a tactile sensation on the basis of the tactile signal input by the control unit 62. In this example, the tactile presentation unit 63 is configured as a vibrator. When a tactile signal (vibration signal) is input by the control unit 62, the tactile presentation unit 63 vibrates in accordance with a waveform of the tactile signal. The tactile presentation unit 63 is provided for each of a plurality of the tactile presentation devices 32. Note that one tactile presentation device 32 may include a plurality of the tactile presentation units 63.

With such a configuration, among the plurality of tactile presentation devices 32, the tactile presentation device 32 determined as the output destination of the tactile signal can present a tactile sensation (present a vibration) in synchronization with the content.

(Operation of Tactile Presentation System)

Next, an operation of the tactile presentation system will be described.

Figure 7:
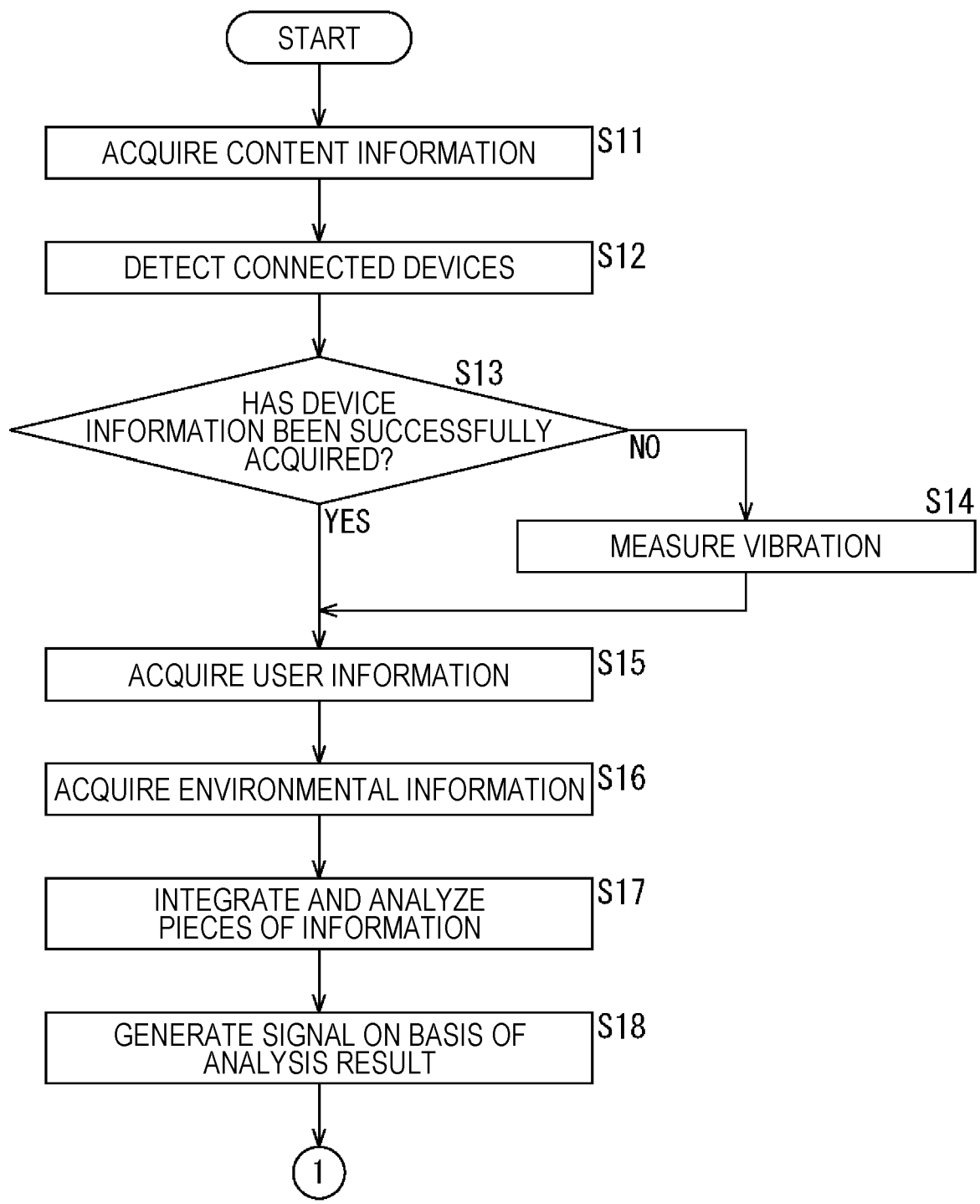
FIG. 7 is a flowchart illustrating tactile presentation control processing.
Figure 8:
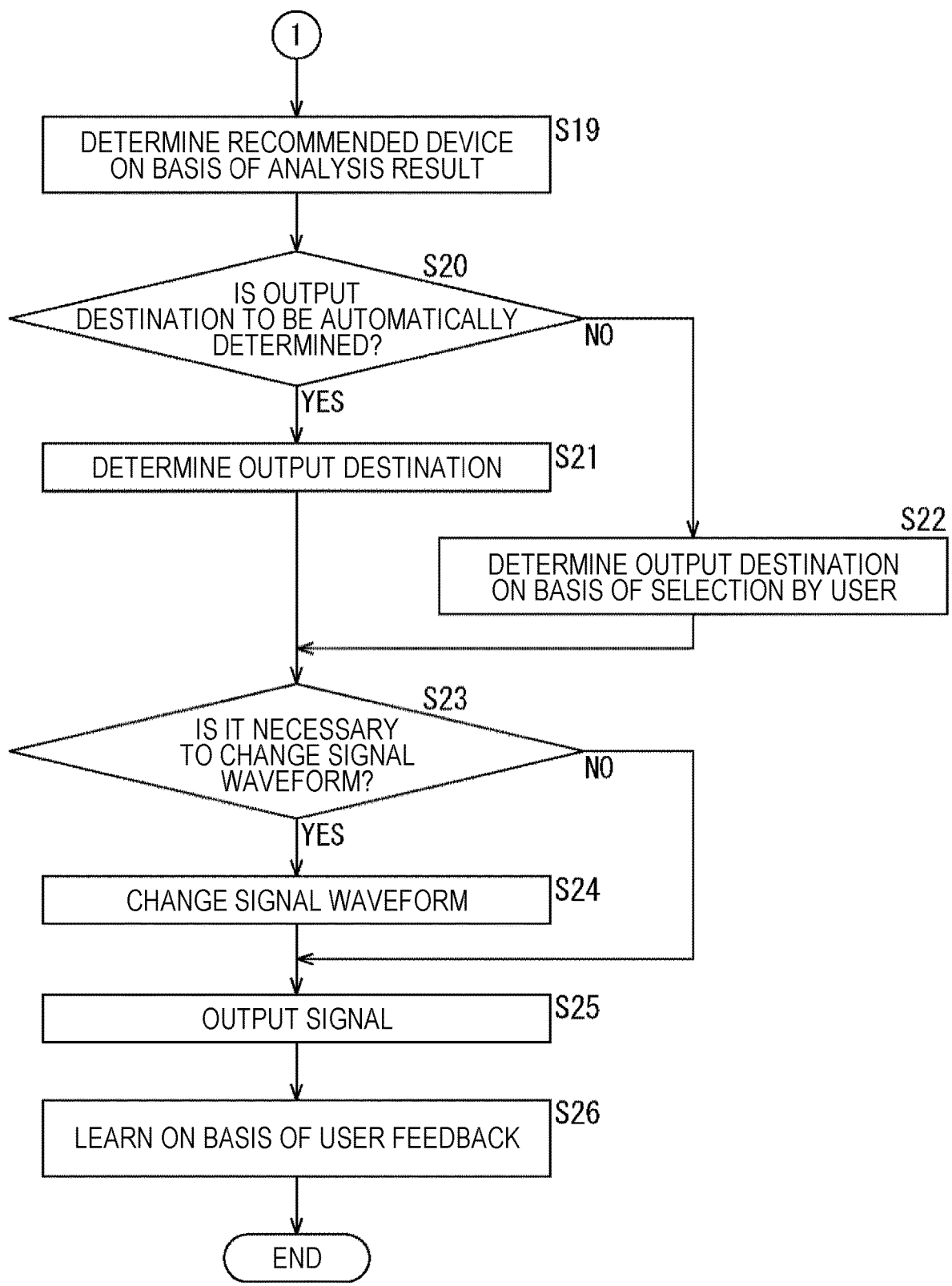
FIG. 8 is a flowchart illustrating the tactile presentation control processing.

FIGS. 7 and 8 are flowcharts illustrating tactile presentation control processing executed by the tactile presentation control device 31 constituting the tactile presentation system.

This tactile presentation control processing is started, for example, at a timing when an application for viewing or playing content such as a moving image, music, or a game with vibration presentation is started on the smartphone 11 in FIG. 1. Furthermore, the tactile presentation control processing may be started at a timing when content being viewed on the smartphone 11 is switched from another piece of content to a piece of content with vibration presentation.

When the tactile presentation control processing is started, in step S11, the information acquisition unit 51 acquires content information regarding content being presented to a user. The content information is included in, for example, metadata added to the content being presented to the user.

Here, for example, information indicating contents of content such as a moving image, a game scene, or a beat or a musical instrument of music, a degree of compatibility indicating compatibility between the contents of the content and a device, and the like are acquired as the content information. The degree of compatibility is used as an index indicating a part of a body where a device is worn to which it is preferable to present a vibration corresponding to, for example, a moving image, a game scene, or a beat or a musical instrument of music.

In step S12, the communication unit 53 detects the tactile presentation devices 32 connected to the tactile presentation control device 31. When the tactile presentation devices 32 are detected, the information acquisition unit 51 starts to acquire device information regarding the tactile presentation devices 32. The device information is information indicating characteristics of the tactile presentation units 63 (vibrators) of the corresponding tactile presentation devices 32.

In step S13, the information acquisition unit 51 determines whether or not the device information has been successfully acquired for each of the connected tactile presentation devices 32.

If it is determined that the information acquisition unit 51 has failed to acquire the device information for each of the connected tactile presentation devices 32, the processing proceeds to step S14.

In step S14, the information acquisition unit 51 measures vibration of the vibrator of the tactile presentation device 32 for which the device information has failed to be acquired.

In a case where the characteristics of the vibrator of the corresponding tactile presentation device 32 have been disclosed, such information is acquired as device information when, for example, the tactile presentation device 32 is detected.

On the other hand, in a case where the characteristics of the vibrator of the corresponding tactile presentation device 32 have not been disclosed, for example, a tactile signal such as a sine wave is input to the tactile presentation device 32, and vibration of the vibrator is measured. With this arrangement, even in a case of a tactile presentation device 32 for which the characteristics of the vibrator have not been disclosed, the characteristics of the vibrator can be acquired as device information. That is, here, the device information is information based on a relationship between a tactile signal (vibration signal) for a vibrator and vibration (measurement result) of the vibrator caused by the vibration signal, and information indicating a frequency characteristic, an acceleration characteristic, a time response characteristic, and the like is acquired as information based on the relationship between the tactile signal (vibration signal) and the vibration of the vibrator.

After the device information has been acquired in step S13 or step S14, the information acquisition unit 51 acquires user information regarding the user who is viewing or playing the content in step S15. The user information is information indicating a body temperature, a heart rate, a perspiration condition, a health condition, or the like of the user, or information indicating a movement or posture of the user.

In step S16, the information acquisition unit 51 acquires environmental information regarding an environment around each of the tactile presentation devices 32.

After acquiring the content information, the device information, the user information, and the environmental information, the information acquisition unit 51 supplies the control unit 52 with the pieces of information acquired.

In step S17, the information analysis unit 71 of the control unit 52 integrates and analyzes the pieces of information from the information acquisition unit 51. Here, for example, on the basis of the content information, it is determined whether or not there is a plurality of vibration waveforms presented on the basis of information indicating contents of the content (e.g., a moving image, a game scene, or a beat or a musical instrument of music). Furthermore, for example, on the basis of the content information, it is determined whether or not there is a device in which a value (score) of a degree of compatibility indicating compatibility between the contents of the content and the device exceeds a predetermined threshold value. A result of the analysis is supplied to the output destination determination unit 72 and the signal generation unit 73 together with the pieces of information used in the analysis.

In step S18, the signal generation unit 73 generates a tactile signal on the basis of the analysis result from the information analysis unit 71 and supplies it to the output control unit 74. The tactile signal may be generated on the basis of a result of analyzing contents of content such as a moving image, a game scene, or a beat or a musical instrument of music, or the content information may include the tactile signal itself.

In step S19 in FIG. 8, the output destination determination unit 72 determines a tactile presentation device 32 recommended as an output destination of the tactile signal (hereinafter referred to as a recommended device) on the basis of the analysis result from the information analysis unit 71 and the pieces of information used in the analysis. Here, to be more specific, the tactile presentation device 32 including the tactile presentation unit 63 recommended as the output destination of the tactile signal is determined.

Figure 9:
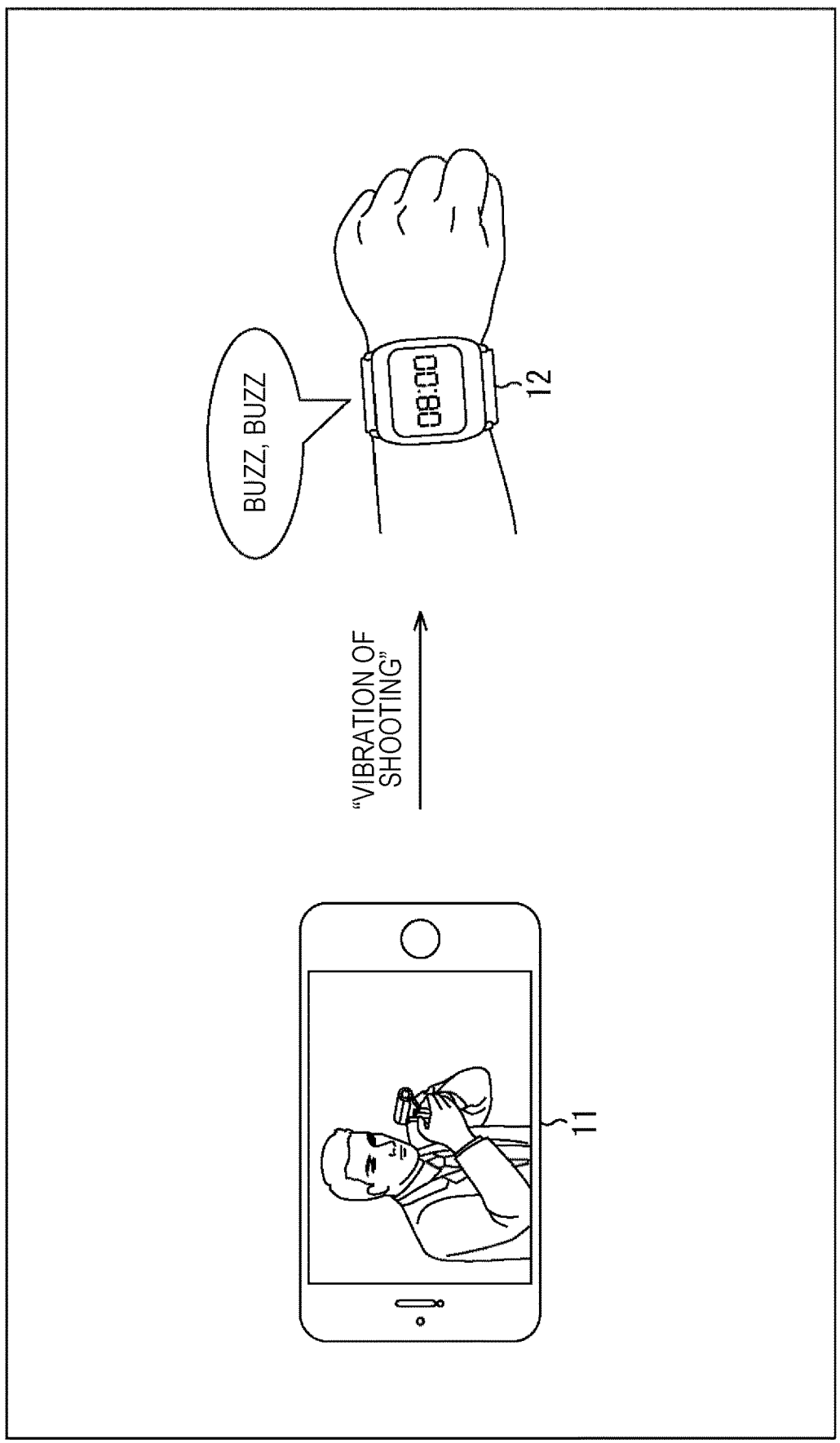
FIG. 9 is a diagram illustrating an example of determining a device in accordance with contents of content.

For example, as illustrated in FIG. 9, in a case where a scene of a moving image being presented by the smartphone 11 is a scene of shooting a pistol, a vibration is preferably presented on a user's arm. In this case, the watch-type device 12 is determined as the recommended device on the basis of the content information indicating the scene.

Although not illustrated, in a case where a game scene being presented by the smartphone 11 is a scene of being shot in the chest with a pistol, a vibration is preferably presented on the user's chest. In this case, the jacket-type device 13 is determined as the recommended device on the basis of the content information indicating the scene.

In a case where a scene of a moving image being presented by the smartphone 11 is a scene of dancing to music, a vibration is preferably presented on the lower body of the user. In this case, the belt-type device 14 is determined as the recommended device on the basis of the content information indicating the scene.

In a case where a scene of a moving image being presented by the smartphone 11 is a scene with a wind in the face, a vibration is preferably presented on the user's face. In this case, the glasses-type device 16 is determined as the recommended device on the basis of the content information indicating the scene.

Furthermore, in a case where a game scene being presented by the smartphone 11 is a scene of driving a racing car, a vibration is preferably presented on the user's hips. In this case, a sheet-type device (not illustrated) may be determined as the recommended device on the basis of the content information indicating the scene.

In the example described above, the recommended device is determined on the basis of the content information indicating the contents of the content, but the determination may be made on the basis of the content information indicating the degree of compatibility between the contents of the content and the device. Moreover, as will be described later in detail, the recommended device may be determined on the basis of a result of analysis of the content information.

Furthermore, it is also possible to determine the recommended device on the basis of the device information indicating the characteristics of the vibrator of each device, regardless of the contents of the content.

Figure 10:
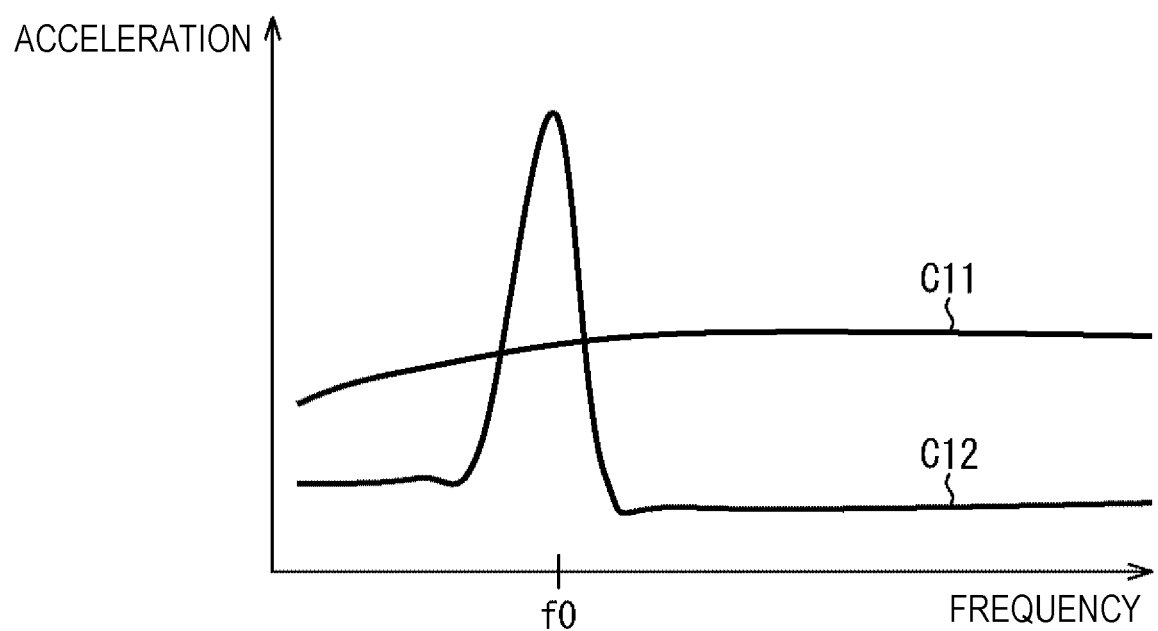
FIG. 10 is a diagram illustrating an example of determining a device in accordance with characteristics of a tactile presentation unit.

FIG. 10 illustrates a frequency-acceleration characteristic of the vibrator included in each of the smartphone 11 and the watch-type device 12.

As illustrated in FIG. 10, the vibrator of the smartphone 11 has a characteristic C11 capable of outputting vibration with a substantially constant acceleration in a wide band, and the vibrator of the watch-type device 12 has a characteristic C12 capable of outputting vibration with a higher acceleration in a narrow band centered on a frequency f0.

Here, in a case where vibration presented by a tactile signal has a vibration waveform including a frequency in a wide band, it is preferable to be able to our vibration with a substantially constant acceleration in a wide band, and the smartphone 11 is therefore determined as the recommended device.

On the other hand, in a case where vibration presented by a tactile signal has a vibration waveform centered on the frequency f0, it is preferable to be able to output vibration with a higher acceleration in a narrow band centered on the frequency f0, and the watch-type device 12 is therefore determined as the recommended device.

Furthermore, a volume of sound included in music, moving images, and games presented to a user may be increased or decreased depending on an environment around the user such as a quiet place or a lively place.

For example, in a case where the volume has been increased, it is preferable to also increase vibration presented in synchronization with them. For this reason, in a case where the volume has been increased, a device capable of outputting vibration with a higher acceleration may be determined as the recommended device on the basis of the device information indicating the characteristics of the vibrator of each device, regardless of the contents of the content.

Now, returning to the flowchart in FIG. 8, when one or more recommended devices have been determined on the basis of the content information or the device information as described above, the processing proceeds to step S20.

In step S20, the output destination determination unit 72 determines whether or not the user has selected automatic determination of a device to be an output destination of the tactile signal.

If it is determined that automatic determination of a device to be an output destination of the tactile signal has been selected, the processing proceeds to step S21.

In step S21, the output destination determination unit 72 determines a device to be an ultimate output destination of the tactile signal (hereinafter referred to as an output destination device). Here, to be more specific, the tactile presentation device 32 including the tactile presentation unit 63 to be an output destination of the tactile signal is determined.

Here, in a case where there is only one recommended device, that device is determined as the output destination device. In a case where there are two or more recommended devices, all the devices may be determined as output destination devices, or any one of the devices may be determined as the output destination device.

In a case of determining any one of a plurality of recommended devices as the output destination device, the determination of any one of the plurality of recommended devices as the output destination device may be made on the basis of priority information regarding a device to be the output destination device.

The priority information is included in metadata of the content, for example. The priority information may indicate that priority is given to taking into consideration compatibility with the contents of the content indicated by the content information, or may be information indicating that priority is given to device specifications (characteristics) indicated by the device information.

Moreover, it is possible to allow information indicating a battery level of each device to be acquired as device information, and information indicating that priority is given to a higher battery level indicated by the device information may be used as priority information.

Furthermore, when an output destination device is determined on the basis of the priority information, among a plurality of recommended devices, a device having specifications that do not meet a certain standard may be excluded from candidates for the output destination device.

On the other hand, if it is determined in step S20 that the automatic determination of an output destination device has not been selected, the processing proceeds to step S22.

In step S22, the output destination determination unit 72 determines an output destination device on the basis of selection by the user.

The selection by the user is made on a device having a user interface, such as the smartphone 11.

Figure 11:
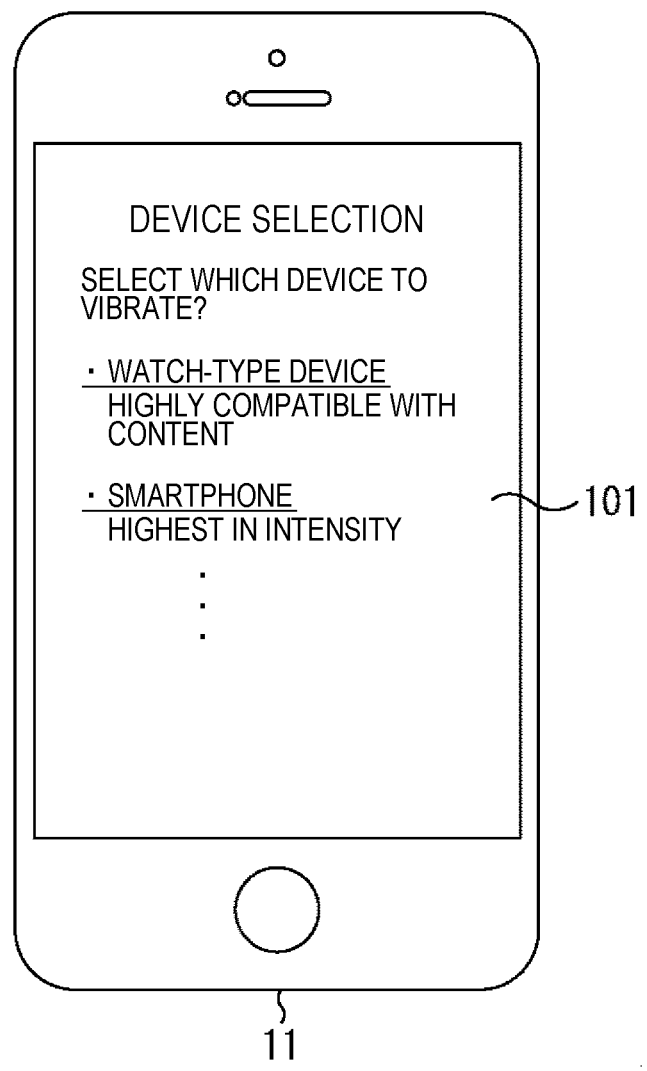
FIG. 11 is a diagram illustrating an example of a device selection screen.

For example, in a case where there is a plurality of recommended devices, as illustrated in FIG. 11, a selection screen for selecting which of these devices is to be the output destination device is displayed on the smartphone 11. In the example in FIG. 11, the watch-type device 12 that is highly compatible with the contents of the content and the smartphone 11 capable of outputting vibration with higher acceleration (intensity) are displayed as candidates for the output destination device.

Furthermore, in a case where there is only one recommended device, devices other than the recommended device may also be selected as candidates for the output destination device.

Note that the number of output destination devices to be determined may be one, or may be two or more.

When one or more output destination devices are determined as described above, the processing proceeds to step S23.

In step S23, the signal generation unit 73 determines whether or not it is necessary to change the signal waveform of the generated tactile signal on the basis of the specifications (characteristics) of the determined output destination device. The specifications of the output destination device can be obtained by referencing the device information.

If it is determined that the signal waveform of the tactile signal needs to be changed, the processing proceeds to step S24, and the signal generation unit 73 changes the signal waveform.

Figure 12:
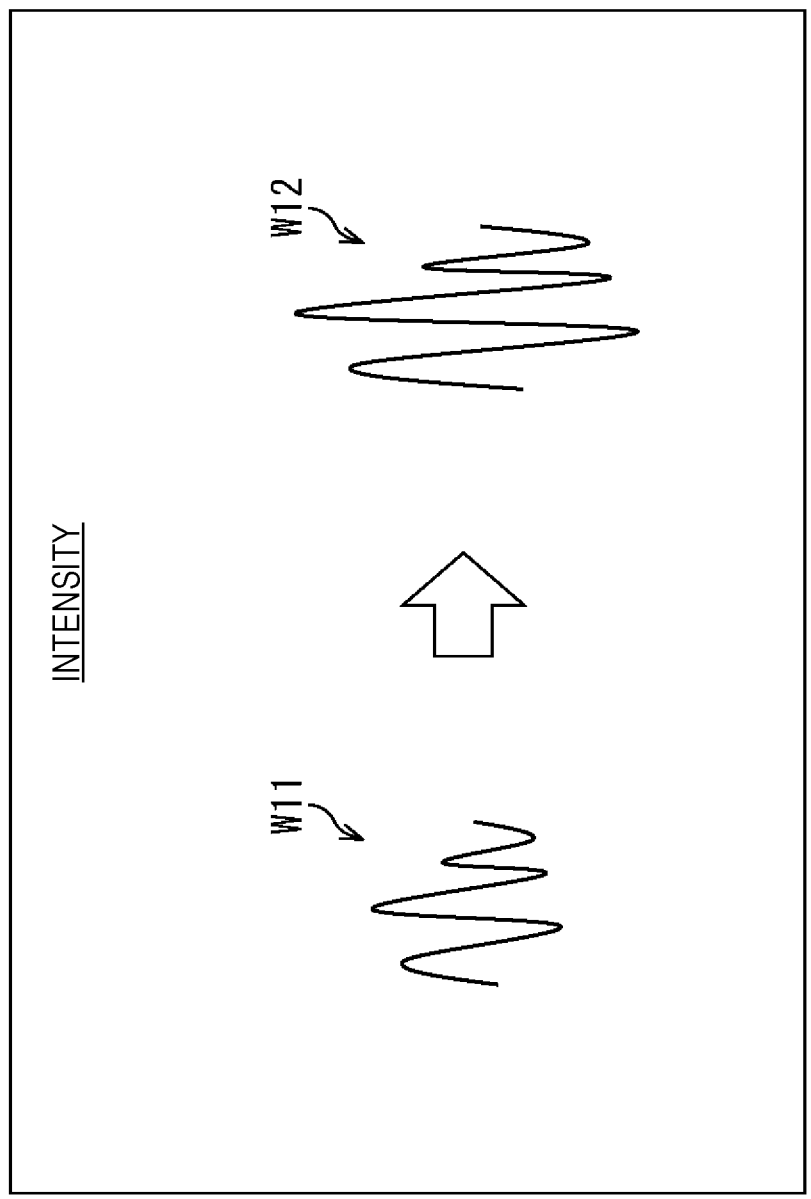
FIG. 12 is a diagram illustrating a change in a tactile signal.

For example, in a case where the vibrator of the output destination device can output vibration with an intensity higher than a certain intensity (acceleration), a tactile signal W11 is changed to a tactile signal W12 with an increased amplitude as illustrated in FIG. 12.

Figure 13:
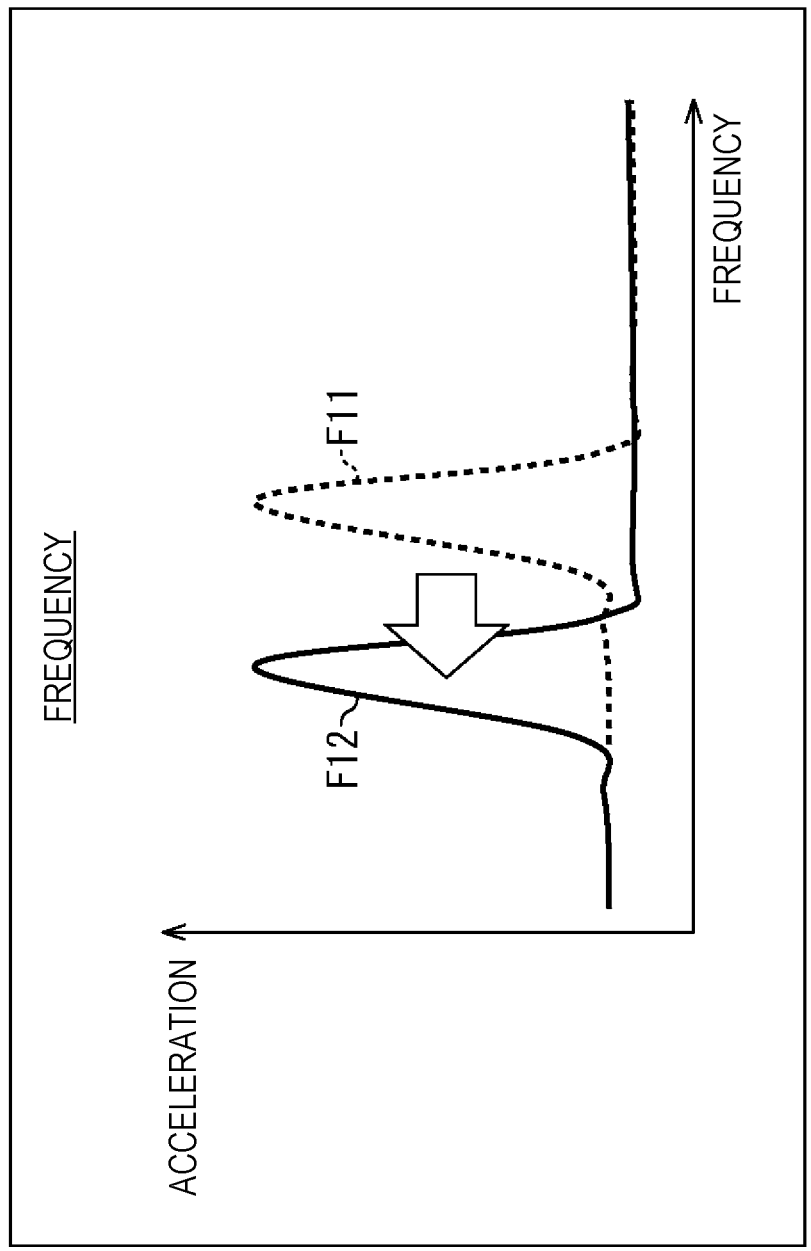
FIG. 13 is a diagram illustrating a change in a tactile signal.

Moreover, in a case where the vibrator of the output destination device can output strong vibration in a band shifted from a main band of the tactile signal, a main band F11 of the original tactile signal is changed to a band F12 in which the vibrator of the output destination device can output strong vibration as illustrated in FIG. 13.

Figure 14:
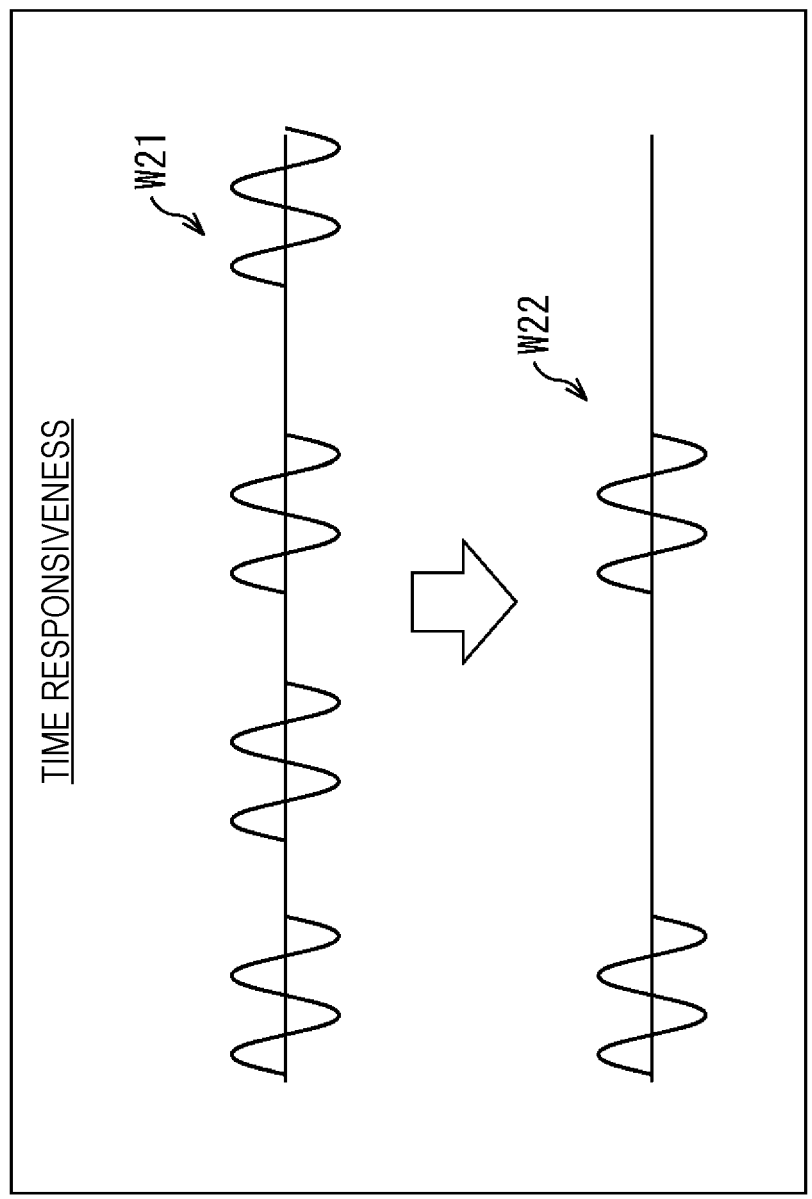
FIG. 14 is a diagram illustrating a change in a tactile signal.

Furthermore, depending on the part of the body with which a device is gripped or where the device is worn, intermittent vibration may be felt like continuous vibration due to time responsiveness of the vibrator of the device. For this reason, in a case where such a device has been determined as the output destination device, a tactile signal W21 is changed to a tactile vibration W22 obtained by decimating the signal waveform, as illustrated in FIG. 14.

On the other hand, if it is determined in step S23 that it is not necessary to change the signal waveform of the tactile signal, step S24 is skipped.

As described above, the generated or changed tactile signal is supplied from the signal generation unit 73 to the output control unit 74.

In step S25, the output control unit 74 controls the communication unit 53 to output the tactile signal from the signal generation unit 73 to the tactile presentation unit 63 of the tactile presentation device 32 determined as the output destination device.

With this arrangement, in the tactile presentation device 32 determined as the output destination device, the tactile presentation unit 63 (vibrator) vibrates in accordance with the waveform of the tactile signal from the tactile presentation control device 31.

By such processing, a tactile sensation synchronized with the content is presented to the user.

Then, in step S26, the learning storage unit 75 learns on the basis of user feedback. Specifically, the information acquisition unit 51 acquires, as user feedback, user information at the time when a tactile sensation is presented by the tact presentation device 32. Then, the learning storage unit 75 learns the user information acquired by the information acquisition unit 51, and stores a result of the learning. The stored learning result (user feedback) is used for information analysis by the information analysis unit 71, and a recommended device or an output destination device is determined on the basis of a result of the analysis.

According to the above processing, on the basis of content information regarding content and device information regarding devices, a device to be an output destination of a tactile signal for causing a tactile sensation corresponding to the content to be presented is determined. With this arrangement, in a case where a user is wearing a plurality of devices that presents tactile sensations, it is possible to assign tactile presentation corresponding to content presented to the user to a device most suitable for the tactile presentation.

3. Determining Device to Present Tactile Sensation

In the example described above, content information or device information is used to determine a recommended device or an output destination device. Alternatively, environmental information or user information may be used.

(Example of Using Environmental Information)

As environmental information, information indicating whether or not the tactile presentation device 32 is being carried by (gripped by, worn by, or in contact with) a user is acquired.

Figure 15:
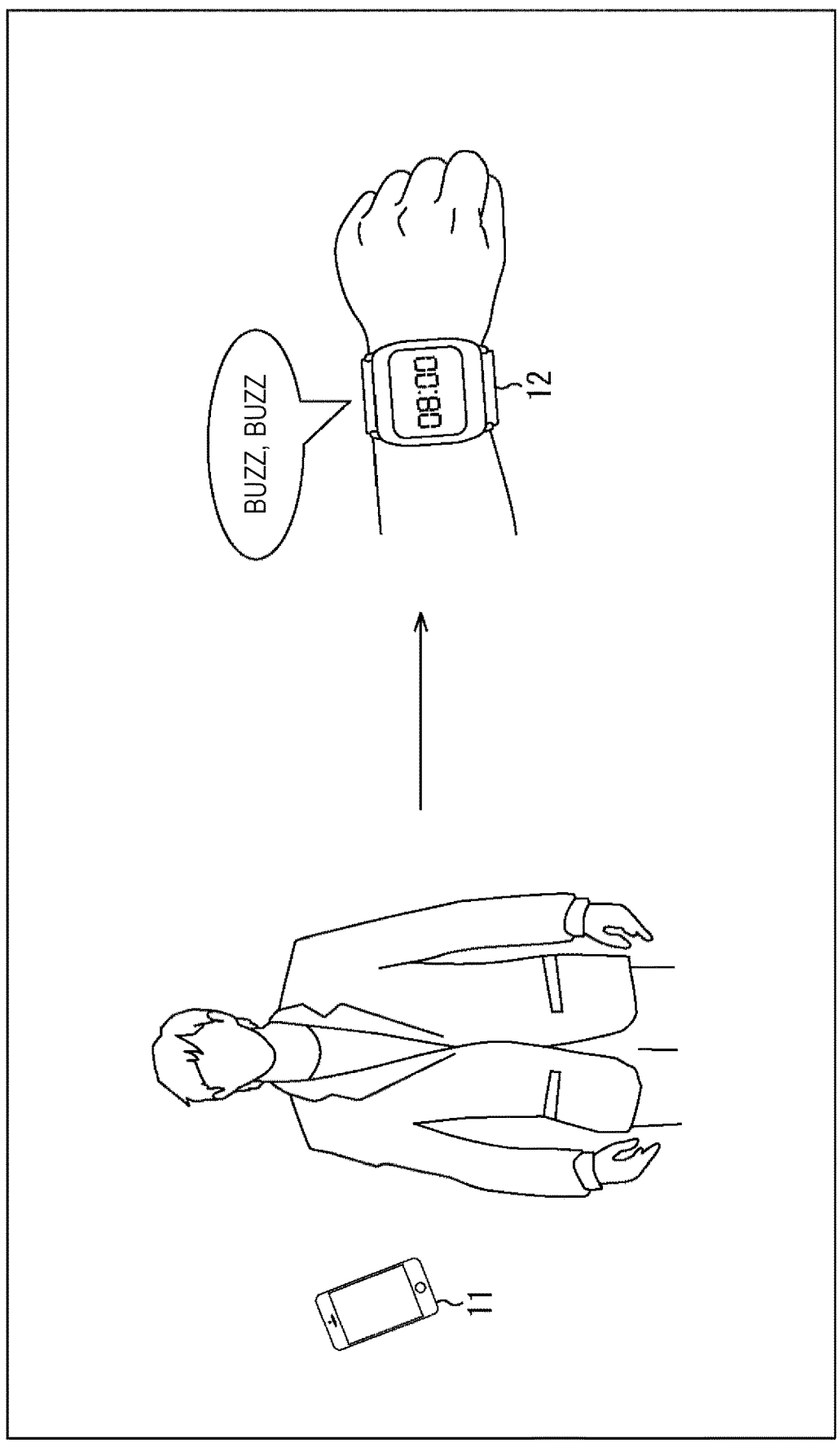
FIG. 15 is a diagram illustrating an example of determining a device in accordance with an environment of the device.

For example, as illustrated in FIG. 15, in a case where a user is not holding the smartphone 11, environmental information indicating that the smartphone 11 is not being gripped by the user is acquired. In this case, on the basis of the environmental information, not the smartphone 11 but the watch-type device 12 worn on a user's arm is determined as the recommended device or the output destination device.

Furthermore, as the environmental information, information indicating whether or not the user is using the tactile presentation device 32 to view content may be acquired.

For example, in a case where the user is viewing the content not on the smartphone 11 but on a visually superior terminal such as a large screen in a home theater, environmental information indicating that the smartphone 11 is not being used by the user to view the content is acquired. In this case, the smartphone 11 is determined as the recommended device or the output destination device (device for vibration) on the basis of the acquired environmental information. In an opposite case, where the user is viewing the content on the smartphone 11, the smartphone 11 may not be determined as the recommended device or the output destination device.

Moreover, as the environmental information, information indicating on which part of the user's body the tactile presentation device 32 is being carried or worn may be acquired.

For example, in a case where the user is carrying a device in a pocket, environmental information indicating that the device is in the pocket is acquired. Whether or not the device is in the pocket can be detected by various sensors such as a speed sensor and a gyro sensor included in the device. In this case, on the basis of the acquired environmental information, the device in the pocket is not determined as the recommended device or the output destination device.

With this arrangement, it is possible not to vibrate the device in the pocket when the user is in an environment where vibration may be transmitted to people around the user such as a crowded train. Note that, in this case, it is also possible to allow the user to select a device to be vibrated.

Furthermore, as the environmental information, whether or not environmental sound around the tactile presentation device 32 is louder than a predetermined volume may be acquired.

For example, in a case where the user is in a lively place where the environmental sound is relatively loud, environmental information indicating that the environmental sound around the device being carried by the user is louder than the predetermined volume is acquired. In this case, a device capable of outputting vibration with a higher acceleration is determined as the recommended device or the output destination device on the basis of the acquired environmental information.

This is because in a case where the user is in a lively place with relatively loud environmental noise, the user often adjusts the volume of sound contained in content such as music, a moving image, or a game the user is viewing, and it is preferable to enhance vibration presented in synchronization with the sound.

(Example of Using User Information)

As the user information, information indicating discomfort such as tickling that a user feels about a device the user is wearing and information indicating an injury or an illness the user has are acquired.

For example, when the user has a grim look, is sweating profusely, or has turned off the vibration of the device, user information indicating discomfort about the device is acquired. An intensity of discomfort indicated by the user information can be obtained by analyzing a result of biological sensing for a facial expression, sweating, or the like or a learning result of a rate of the vibration function being turned off, based on the user feedback described above.

Here, in a case where the intensity of discomfort indicated by the user information exceeds a certain level, the device is not determined as the recommended device or the output destination device. Note that, in this case, it is also possible to allow the user to specify a device not to be vibrated.

Furthermore, as the user information, information indicating a behavior or a posture of a user who is carrying or wearing a device may be acquired.

For example, as illustrated in FIG. 16, in a case where a user is running, user information indicating that the user is running is acquired. In a case where the user is running, for example, a device in a clothing pocket moves in the pocket, and the user cannot feel its vibration. For this reason, in this case, the watch-type device 12 directly worn on a user's arm is determined as the recommended device or the output destination device on the basis of the acquired user information.

Furthermore, for example, in a case where a user is lying on a floor, user information indicating that the user is lying is acquired. In a case where the user is lying on the floor, when a device in contact with the floor vibrates, the vibration is transmitted to the floor, and the user feels uncomfortable. For this reason, in this case, a device not in contact with the floor is determined as the recommended device or the output destination device on the basis of the acquired user information. Moreover, in this case, for example, it is also possible to vibrate only at least one of the vibrators included in the jacket-type device 13 (for example, the vibrator provided at a position corresponding to the back, which is not in contact with the floor).

Note that, in the tactile presentation according to the embodiment of the present disclosure, the method of determining a recommended device may be applied to determination of the output destination device, or the method of determining the output destination device may be applied to determination of a recommended device.

(Recommendation of Device Based on Content Analysis)

In the following, details of an example in which a recommended device is determined on the basis of a result of analysis of contents of content (content analysis) will be described.

Figure 17:
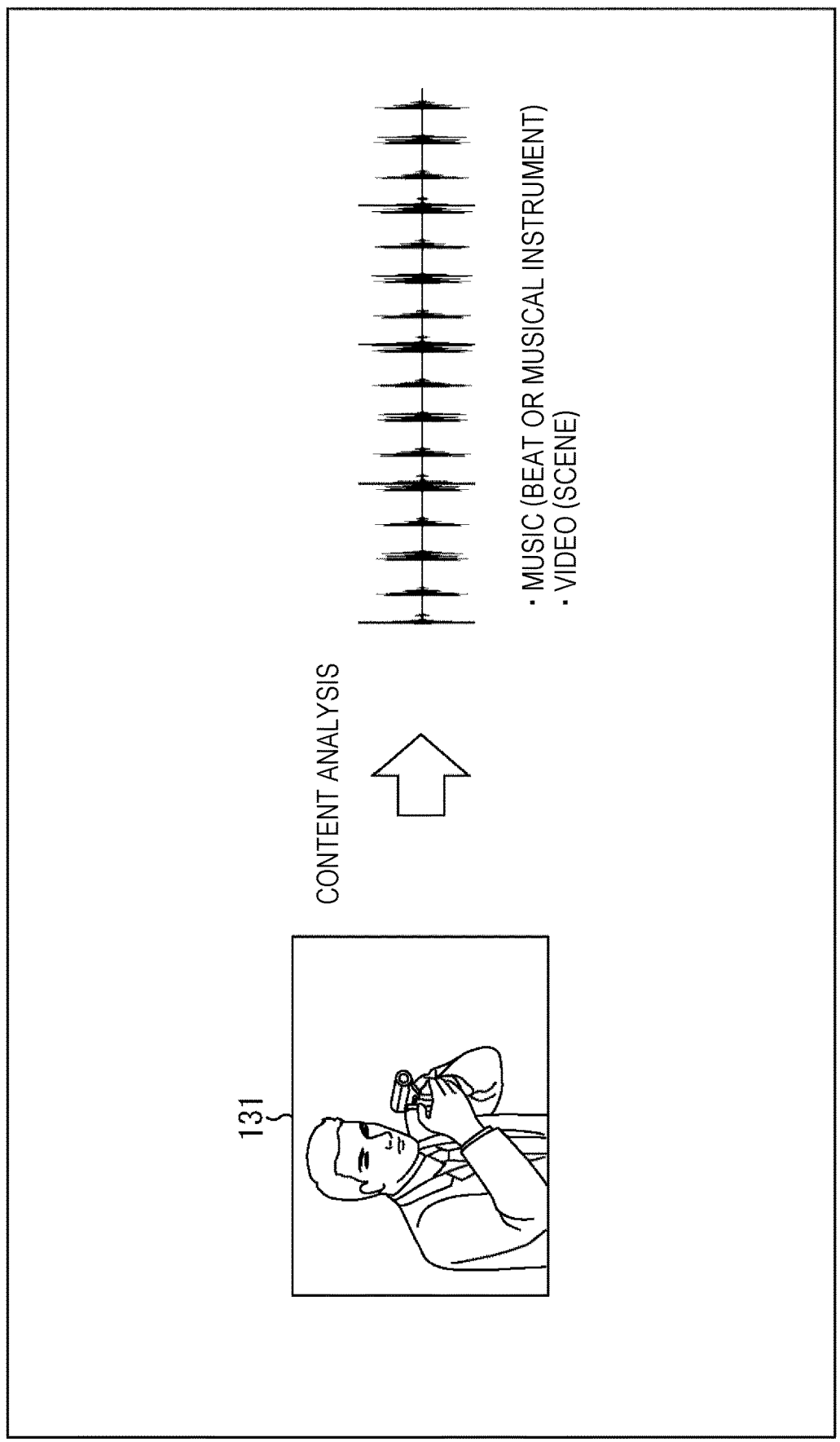
FIG. 17 is a diagram illustrating recommendation of a device based on content analysis.

As illustrated in FIG. 17, contents of content 131 are analyzed by the information analysis unit 71. In the example in FIG. 17, it is determined whether a beat or a musical instrument of music, a scene in a video, or the like is included in the content 131, which is a moving image.

Specifically, it is determined whether or not music included in the content 131 contains many beats (sound units) that causes a strong feeling of an attack sound (sharpness) from when sound begins (attack) to when the sound reaches a maximum volume. In other words, it is determined whether or not an audio signal of the music contains many pulse-like waveforms with short intervals.

For example, in a case where it is determined that many sharp beats are contained, the smartphone 11 that can present a vibration to a sensitive part such as a fingertip or a device worn on a fingertip is determined as the recommended device. Furthermore, in a case where it is determined that many sharp beats are contained, a device having a vibrator having a higher time responsiveness may be determined as the recommended device.

Furthermore, the type of music used is determined from a frequency component contained in the audio signal of the music included in the content 131.

For example, in a case where it is determined that a snare drum is used, a device having a vibrator capable of outputting a higher frequency vibration is determined as the recommended device. On the other hand, in a case where it is determined that a bass drum is used, a device having a vibrator capable of outputting a lower frequency vibration is determined as the recommended device.

Moreover, it is determined whether or not many scenes that require output of vibration having a larger amplitude (acceleration) in synchronization with a video included in the content 131 are included.

For example, in a case where it is determined that many scenes that require output of vibration having a larger amplitude are included, a device having a vibrator capable of outputting vibration having a larger amplitude is determined as the recommended device.

In this way, on the basis of content analysis, a device having a vibrator capable of outputting vibration corresponding to a result of the analysis can be determined as the recommended device.

(Variations of Content Analysis)

The content analysis can also be performed as follows.

As described above, the content analysis can be performed using content information added as metadata to content. The metadata can be added to the content, for example, by a creator of the content.

Furthermore, it is also possible to allow viewers of content to add, on a website such as a social networking service (SNS), an evaluation for the content to the content as metadata.

Moreover, is a case where metadata has not been added to content presented to a user, sound and video included in the content may be analyzed, and a similarity with another piece of content may be calculated on the basis of a result of the analysis. In this case, for example, metadata added to content having the highest similarity as a result of the similarity calculation is used as metadata of the content presented to the user.

For example, in a case where the content presented to the user is music, a genre of the music (e.g., pops, club music such as electronic dance music (EDM), or jazz) may be added as metadata to the content.

In this case, a recommended device can be determined on the basis of the genre of music.

Furthermore, in a case where metadata has not been added to music content presented to a user, a genre of the music content may be estimated on the basis of a sound analysis result, and a recommended device may be determined on the basis of the estimated genre.

Moreover, determination of a recommended device may be made on the basis of a similarity with content to which a recommended device has already been assigned. Again, the similarity is calculated by analyzing the sound and video included in the content to which the recommended device has already been assigned.

These analyses can be performed by the tactile presentation control device 31, regardless of whether the tactile presentation control device 31 is configured as a server or as a device that presents a tactile sensation. Furthermore, these analyses may be performed in real time when the content is presented to the user (e.g., when the content is reproduced), or may be performed in advance before the content is presented.

4. Assignment of Tactile Presentation to Plurality of Devices

As described above, in the tactile presentation according to the embodiment of the present disclosure, the tactile presentation can be assigned to a plurality of devices.

(Example of Device Determination Based on Degree of Compatibility)

For example, the output destination device may be determined on the basis of the score for the degree of compatibility described above.

Figure 18:
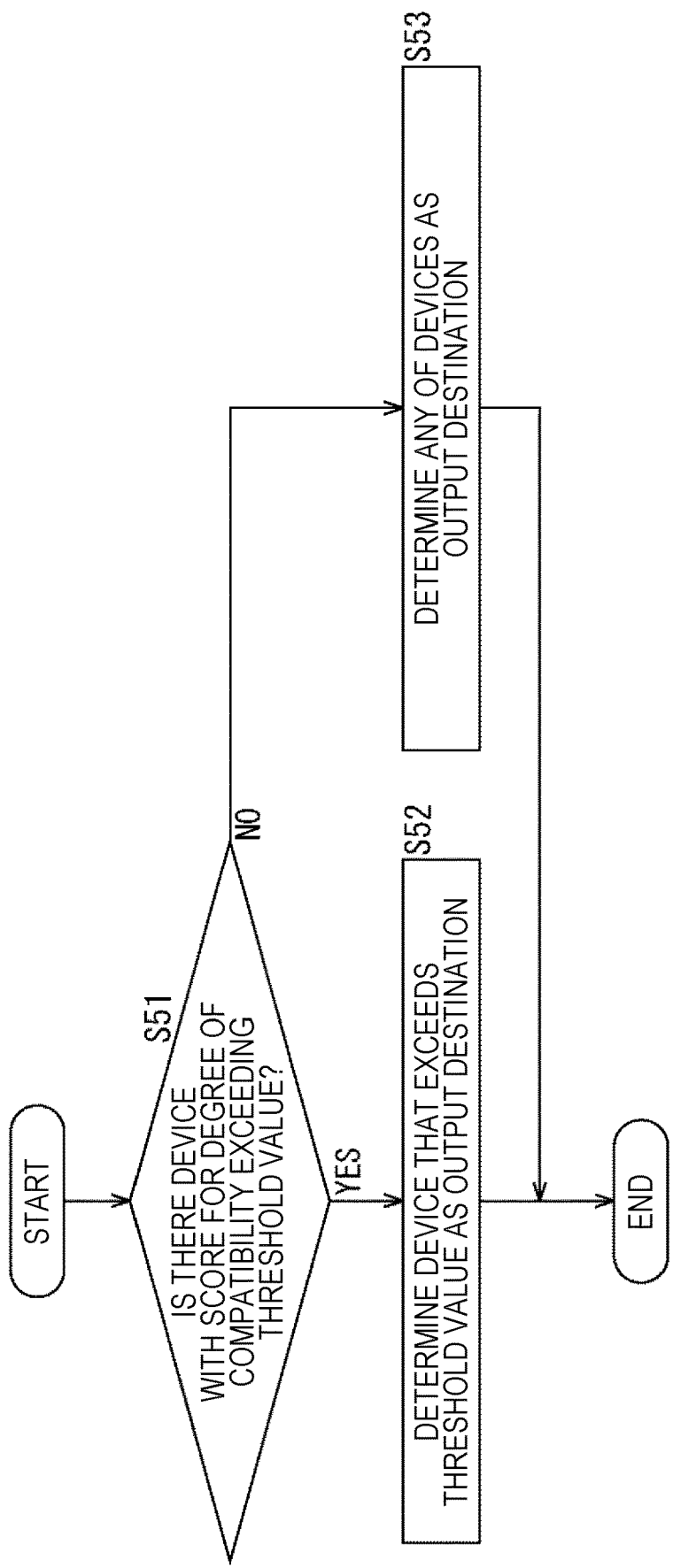
FIG. 18 is a flowchart illustrating device determination processing based on a degree of compatibility.

FIG. 18 is a flowchart illustrating device determination processing based on the degree of compatibility. This processing is executed in a case where, for example, scores for the degree of compatibility of a plurality of devices determined as the recommended devices in step S21 in FIG. 8 are in a close range.

In step S51, the output destination determination unit 72 determines whether or not there is a device with a score for the degree of compatibility exceeding a predetermined threshold value, among the plurality of devices.

If it is determined that there is a device with a score for the degree of compatibility exceeding the predetermined threshold value, the processing proceeds to step S52, and the output destination determination unit 72 determines the device that exceeds the threshold value as the output destination device.

On the other hand, if it is determined that there is no device with a score for the degree of compatibility exceeding the predetermined threshold value, the processing proceeds to step S53, and the output destination determination unit 72 determines any of the devices as the output destination of the tactile signal.

For example, a case is assumed in which three devices, that is, the smartphone 11, the watch-type device 12, and the jacket-type device 13, have been determined as the recommended devices. Furthermore, a threshold value Mth for scores for the degree of compatibility is assumed to be 4.

In a case where degrees of compatibility M11, M12, and M13 of the corresponding devices are M11=10, M12=10, and M13=1, respectively, the smartphone 11 and the watch-type device 12, each having a score for the degree of compatibility exceeding the threshold value Mth=4 are determined as the output destination devices.

On the other hand, in a case where the degrees of compatibility M11, M12, and M13 of the corresponding devices are M11=2, M12=2, and M13=1, respectively, none of the devices has a score for the degree of compatibility exceeding the threshold value Mth=4. In this case, any of the smartphone 11, the watch-type device 12, or the jacket-type device 13 may be determined as the output destination device. For example, a device selected by a user from the devices, that is, the smartphone 11, the watch-type device 12, and the jacket-type device 13, is determined as the output destination device.

(Tactile Presentation on Plurality of Devices)

Figure 19:
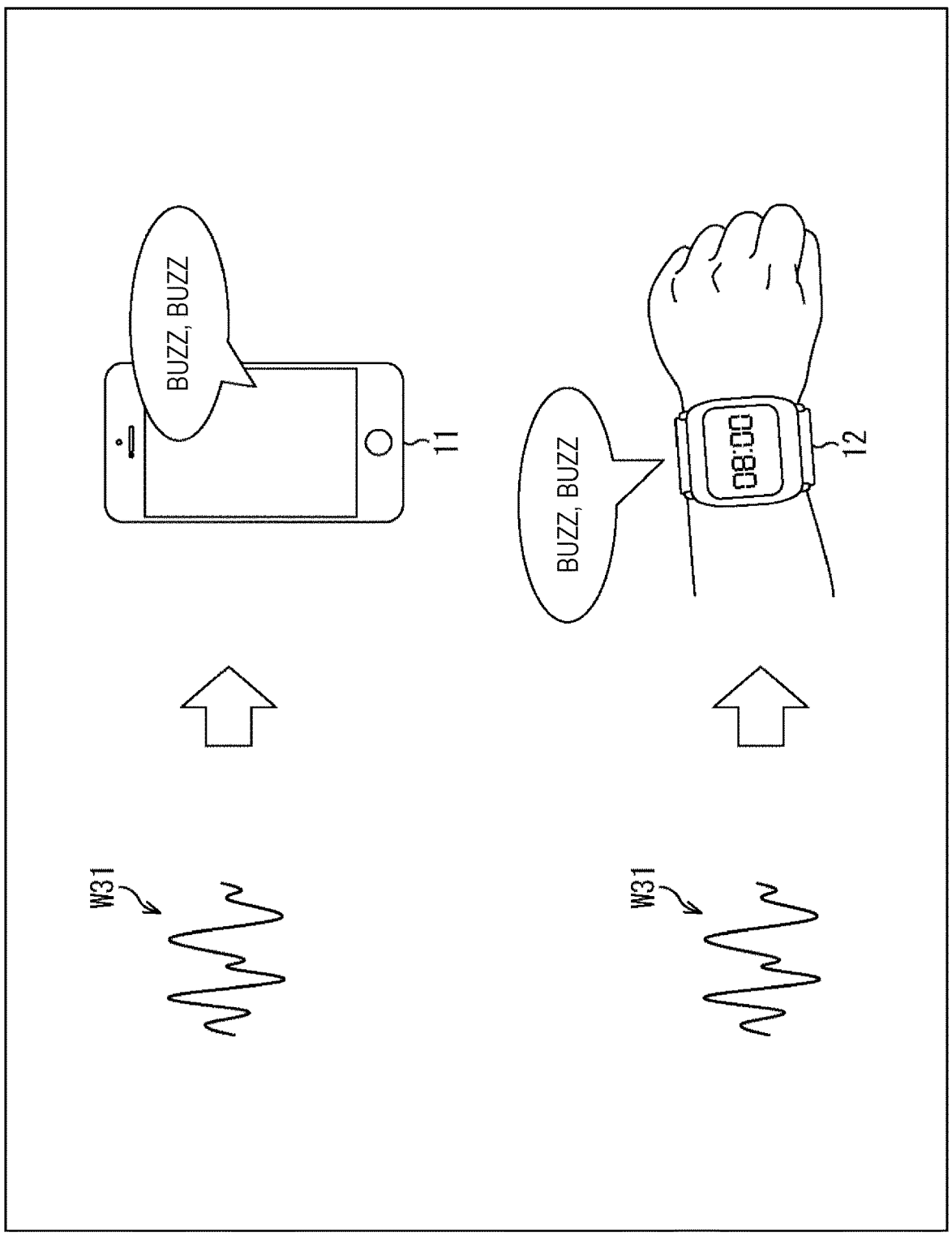
FIG. 19 is a diagram illustrating an example of assigning tactile presentation to a plurality of devices.

In a case where a tactile sensation is presented by a plurality of devices, the signal waveform of the tactile signal output to each device may be the same for all the devices as illustrated in FIG. 19.

In the example in FIG. 19, tactile signals W31 having the same waveform are output to the smartphone 11 and the watch-type device 12, and each of the smartphone 11 and the watch-type device 12 presents the same vibration in accordance with the tactile signal W31.

In this case, output destination devices of the tactile signals W31 may be all the tactile presentation devices 32 connected to the tactile presentation control device 31, or may be selected from the tactile presentation devices 32 by a user. Furthermore, content information added as metadata to content may include information that specifies output destination devices, and a plurality of tactile presentation devices 32 specified by the information may become the output destination devices of the tactile signals W31.

Furthermore, as described with reference to the flowchart in FIG. 18, in a case where scores for the degree of compatibility of a plurality of devices are in a close range, devices with a score for the degree of compatibility exceeding the threshold value may become the output destination devices of the tactile signals W31.

In a case opposite to the example described above, where a tactile sensation is presented by a plurality of devices, the signal waveform of the tactile signal output to each device may differ for each of the devices as illustrated in FIG. 20.

In the example in FIG. 20, the tactile signal W31 is output to the smartphone 11, while a tactile signal W32 having a waveform different from that of the tactile signal W31 is output to the watch-type device 12. With this arrangement, the smartphone 11 and the watch-type device 12 present different vibrations in accordance with the tactile signals W31 and W32, respectively.

In this case, the output destination devices of the tactile signals W31 and W32 may be selected by a user from all the tactile presentation devices 32 connected to the tactile presentation control device 31. Furthermore, content information added as metadata to content may include information that specifies output destination devices, and a plurality of tactile presentation devices 32 specified by the information may become the output destination devices of the tactile signals W31 and W32.

Furthermore, as described with reference to the flowchart in FIG. 18, in a case where scores for the degree of compatibility of a plurality of devices are in a close range, devices with a score for the degree of compatibility exceeding the threshold value may become the output destination devices of the tactile signals W31 and W32. In this case, the threshold value for the score for the degree of compatibility is set, for example, for each part (instrument) of music so that an appropriate device is selected for each part.

Note that an example in which a tactile sensation is presented by a plurality of devices being carried by one user has been described above, but a tactile sensation may be presented by each of devices being carried by a plurality of users.

For example, a situation is assumed in which two users UA and UB are viewing the same content (moving image) on the corresponding smartphones 11 the users UA and UB are carrying.

As illustrated in FIG. 21, in the content, it is assumed that a context of "punch" is output in a scene where a person punches another person in the face. In this case, as a tactile presentation, one user is presented with a tactile sensation in a hand (vibration of the person who is throwing a punch), and another user is presented with a tactile sensation in the face (vibration of the person who is receiving the punch).

In the example in FIG. 21, a tactile signal W41 that reproduces a tactile sensation presented to a hand is output to a watch-type device 12A being carried by the user UA, and a tactile signal W42 that reproduces a tactile sensation presented to the face is output to a glasses-type device 16B being carried by the user UB.

The tactile signals W41 and W42 may be held in advance for each of the hand and the face as data corresponding to the context of "punch", or may be generated in real time on the basis of one tactile signal. In the latter case, the amplitude, frequency, output timing, and the like of the tactile signal are adjusted on the basis of the body parts and the magnitudes of the movements of the persons in the moving image, and the tactile signals W41 and W42 are generated from one tactile signal.

Note that the context of "punch" may be included as content information in metadata added to the content, or may be generated by image processing such as motion analysis for the moving image.

5. Others (Other Examples of Tactile Presentation)

While examples in which a vibration is presented as tactile presentation to a user have been described above, the tactile presentation system to which the technique according to the present disclosure is applied can also perform other types of tactile presentation such as temperature presentation, force sense presentation, and pressure sense presentation.

For example, a temperature may be presented as tactile presentation to a user.

In this case, a device affected the least by a temperature change (e.g., a device itself being damaged by a temperature rise or other functions such as outputting video or music being hindered) is determined as the recommended device or the output destination device.

Moreover, a device having more favorable conditions for presenting the temperature may be determined as the recommended device or the output destination device. For example, in a case where a user is wearing a watch-type device and a belt-type device, the watch-type device that is in direct contact with the user's skin (the user can better get a sense of temperature) is determined as the output destination device.

Furthermore, the output destination device may be determined in accordance with the type of tactile presentation (tactile stimulation). For example, a tactile signal for causing a vibration to be presented is output to a smartphone, and a tactile signal for causing a temperature to be presented is output to a watch-type device.

Moreover, the output destination device may be determined in accordance with a difference in sensitivity to tactile presentation (tactile stimulation).

Specifically temperature presentation is performed by a device having more favorable conditions for presenting a temperature among a plurality of devices being worn by a user. For example, in a case where a user is wearing a watch-type device and a belt-type device, the watch-type device that is in direct contact with the user's skin (the user can better get a sense of temperature) is determined as the output destination device for temperature presentation. In this case, since a sense of vibration can be gotten even through clothes, the belt-type device is determined as the output destination device for vibration presentation.

Furthermore, as tactile presentation to a user, a force sense may be presentation by electrical stimulation. In this case, a force sense is presented by a device that is in direct contact with the user's skin. For example, in a case where a user is wearing a watch-type device and a belt-type device, the watch-type device that is in direct contact with the skin is determined as the output destination device for force sense presentation, and the belt-type device is determined as the output destination device for vibration presentation.

In the above description, content presented to a user visually or aurally appeals to the user, such as moving images and music, but the content is not limited to this and may be any content that provides some information to the user.

For example, content itself presented to a user may be a vibration, a temperature, a force sense, or a pressure sense. In this case, for example, a plurality of devices presents a vibration, a temperature, and the like in synchronization with a vibration presented to the user.

That is, in the tactile presentation system to which the technique according to the present disclosure is applied, regardless of the form of content presented to a user, tactile presentation corresponding to the content can be assigned to the most suitable device.

10. Configuration Example of Computer

The series of pieces of processing described above can be executed not only by hardware but also by software. In a case where the series or pieces of processing is executed by software, a program constituting the software is installed on a computer. Here, the computer includes a computer incorporated in dedicated hardware, or a general-purpose personal computer capable of executing various functions with various programs installed therein, for example.

FIG. 22 is a block diagram illustrating a configuration example of hardware of a computer that executes the series of pieces of processing described above in accordance with a program.

In the computer, a central processing unit (CPU) 1001, a read only memory (ROM) 1002, and a random access memory (RAM) 1003 are connected to each other by a bus 1004.

The bus 1004 is further connected with an input/output interface 1005. The input/output interface 1005 is connected with an input unit 1006, an output unit 1007, a storage unit 1008, a communication unit 1009, and a drive 1010.

The input unit 1006 includes a keyboard, a mouse, a microphone, and the like. The output unit 1007 includes a display, a speaker, and the like. The storage unit 1008 includes a hard disk, a non-volatile memory, and the like. The communication unit 1009 includes a network interface and the like. The drive 1010 drives a removable medium 1011 such as a magnetic disk, an optical disk, a magneto-optical disk, or a semiconductor memory.

To perform the series of pieces of processing described above, the computer configured as described above causes the CPU 1001 to, for example, load a program stored in the storage unit 1008 into the RAM 1003 via the input/output interface 1005 and the bus 1004 and then execute the program.

The program to be executed by the computer (CPU 1001) can be provided by, for example, being recorded on the removable medium 1011 as a package medium or the like. Furthermore, the program can be provided via a wired or wireless transmission medium such as a local area network, the Internet, or digital satellite broadcasting.

Inserting the removable medium 1011 into the drive 1010 allows the computer to install the program into the storage unit 1008 via the input/output interface 1005. Furthermore, the program can be received by the communication unit 1009 via a wired or wireless transmission medium and installed into the storage unit 1008. In addition, the program can be installed in advance in the ROM 1002 or the storage unit 1008.

Note that the program to be executed by the computer may be a program that performs the pieces of processing in chronological order as described in the present specification, or may be a program that performs the pieces of processing in parallel or when needed, for example, when the processing is called.

In the present specification, a system means a set of a plurality of components (devices, modules (parts), and the like), and it does not matter whether or not all components are in the same housing. Thus, a plurality of devices housed in separate housings and connected via a network, and one device having a plurality of modules housed in one housing are both systems.

Note that the effects described herein are merely illustrative and are not intended to be restrictive, and other effects may be obtained.

Embodiments of the present disclosure are not limited to the embodiment described above, and can be modified in various ways within a scope of the present disclosure.

For example, the present disclosure can have a cloud computing configuration is which a plurality of devices shares one function and collaborates in processing via a network.

Furthermore, each step described in the above-described flowcharts can be executed by one device or can be shared by a plurality of devices.

Moreover, is a case where a plurality of pieces of processing is included in one step, the plurality of pieces of processing included in that step can be executed by one device or can be shared by a plurality of devices.

(Other Configurations that Present Disclosure may Have)

Moreover, the present disclosure may have the following configurations.

(1)

An information processing apparatus including a control unit that controls, on the basis of content information regarding content presented to a user and device information regarding a plurality of devices that the user is carrying, each device having a tactile presentation unit that presents a tactile sensation to the user, output of a tactile signal for causing at least one of the plurality of devices having the tactile presentation units to make the tactile presentation unit present a tactile sensation corresponding to the content.

(2)

The information processing apparatus according to (1), in which the control unit determines, from among the plurality of devices, an output destination device having the tactile presentation unit to be ac output destination of the tactile signal, on the basis of at least one of the content information or the device information.

(3)

The information processing apparatus according to (2), in which the content information includes information indicating contents of the content.

(4)

The information processing apparatus according to (2), in which the content information includes a degree of compatibility indicating compatibility between contents of the content and the devices.

(5)

The information processing apparatus according to (4), in which the control unit determines, in a case where any one of the devices has a score for the degree of compatibility exceeding a predetermined threshold value, the device with the score for the degree of compatibility exceeding the threshold value as the output destination device.

(6)

The information processing apparatus according to (4) or (5), in which the control unit determines, in a case where none of the devices has a score for the degree of compatibility exceeding a predetermined threshold value, any of the devices as the output destination device.

(7)

The information processing apparatus according to any one of (2) to (6), in which the content information is information added to the content as metadata.

(8)

The information processing apparatus according to any one of (2) to (7), in which the control unit determines the output destination device on the basis of a result of analysis of the content information.

(9)

The information processing apparatus according to (2), in which the device information includes information indicating characteristics of the tactile presentation units.

(10)

The information processing apparatus according to (9), in which the tactile presentation units are configured as vibrators, and the control unit outputs, as the tactile signal, vibration signals for causing the vibrators to vibrate.

(11)

The information processing apparatus according to (10), in which the device information includes information indicating at least one of frequency characteristics, acceleration characteristics, or time response characteristics of vibrations of the vibrators.

(12)

The information processing apparatus according to (11), in which the device information includes information based on relationships between the vibration signals for the vibrators and the vibrations of the vibrators caused by the vibration signals.

(13)

The information processing apparatus according to any one of (9) to (12), in which the control unit changes and outputs the tactile signal on the basis of the device information of the output destination device.

(14)

The information processing apparatus according to any one of (2) to (13), in which the control unit outputs the same tactile signal to the tactile presentation units of a plurality of the output destination devices determined as output destinations of the tactile signal.

(15)

The information processing apparatus according to any one of (2) to (13), in which the control unit outputs the tactile signal that differs for each of the output destination devices to the tactile presentation units of a plurality of the output destination devices determined as output destinations of the tactile signal.

(16)

The information processing apparatus according to any one of (1) to (15), in which the control unit further uses environmental information regarding environments around the plurality of devices to determine the output destination device.

(17)

The information processing apparatus according to any one of (2) to (15), in which the control unit further uses user information regarding the user carrying the plurality of devices to determine the output destination device.

(18)

The information processing apparatus according to (17), in which the control unit determines the output destination device on the basis of a learning result of learning the user information acquired when a tactile sensation is presented by the tactile presentation unit.

(19)

An information processing method including controlling, by an information processing apparatus, on the basis of content information regarding content presented to a user and device information regarding a plurality of devices that the user is carrying, each device having a tactile presentation unit that presents a tactile sensation to the user, output of a tactile signal for causing at least one of the plurality of devices having the tactile presentation units to make the tactile presentation unit present a tactile sensation corresponding to the content.

(20)

A recording medium on which a program is recorded, the program being for causing a computer to execute processing of controlling, on the basis of content information regarding content presented to a user and device information regarding a plurality of devices that the user is carrying, each device having a tactile presentation unit that presents a tactile sensation to the user, output of a tactile signal for causing at least one of the plurality of devices having the tactile presentation units to make the tactile presentation unit present a tactile sensation corresponding to the content.

REFERENCE SIGNS LIST

31 Tactile presentation control device
32 Tactile presentation device
51 Information acquisition unit
52 Control unit
53 Communication unit
61 Communication unit
62 Control unit
63 Tactile presentation unit
71 Information analysis unit
72 Output destination determination unit
73 Signal generation unit
74 Output control unit
75 Learning storage unit

The invention claimed is:

1. An information processing apparatus comprising:
a control unit configured to
control output of a tactile signal, on a basis of content information regarding content presented to a user and device information regarding a plurality of devices that the user is carrying, each device of the plurality of devices having a tactile presentation unit configured to present tactile sensation to the user, and
determine, from among the plurality of devices, at least one output destination device having the tactile presentation unit to be an output destination of the tactile signal, on a basis of the content information and the device information,
wherein the output of the tactile signal causes the at least one output destination device of the plurality of devices having the tactile presentation units to make the tactile presentation unit of each output destination device present a tactile sensation corresponding to the content, and
wherein the control unit is implemented via at least one processor.

2. The information processing apparatus according to claim 1, wherein
the content information includes information indicating contents of the content.

3. The information processing apparatus according to claim 1, wherein
the content information includes a degree of compatibility indicating compatibility between contents of the content and the devices.

4. The information processing apparatus according to claim 3, wherein
the control unit determines, in a case where any one of the devices has a score for the degree of compatibility exceeding a predetermined threshold value, each device with the score for the degree of compatibility exceeding the threshold value as the at least one output destination device.

5. The information processing apparatus according to claim 3, wherein
the control unit determines, in a case where none of the devices has a score for the degree of compatibility exceeding a predetermined threshold value, any of the devices as the at least one output destination device.

6. The information processing apparatus according to claim 1, wherein the content information is information added to the content as metadata.

7. The information processing apparatus according to claim 1, wherein
the control unit determines the at least one output destination device on a basis of a result of analysis of the content information.

8. The information processing apparatus according to claim 1, wherein
the device information includes information indicating characteristics of the tactile presentation units.

9. The information processing apparatus according to claim 8, wherein
the tactile presentation units are configured as vibrators, and the control unit outputs, as the tactile signal, vibration signals for causing the vibrators to vibrate.

10. The information processing apparatus according to claim 9, wherein
the device information includes information indicating at least one of frequency characteristics, acceleration characteristics, or time response characteristics of vibrations of the vibrators.

11. The information processing apparatus according to claim 10, wherein
the device information includes information based on relationships between the vibration signals for the vibrators and the vibrations of the vibrators caused by the vibration signals.

12. The information processing apparatus according to claim 8, wherein
the control unit is further configured to
change the tactile signal, and
output the changed tactile signal on a basis of the device information of the at least one output destination device.

13. The information processing apparatus according to claim 1, wherein
the control unit outputs the same tactile signal to the tactile presentation units of a plurality of output destination devices determined as output destinations of the tactile signal.

14. The information processing apparatus according to claim 1, wherein
the control unit outputs the tactile signal that differs for each output destination device to the tactile presentation units of a plurality of output destination devices determined as output destinations of the tactile signal.

15. The information processing apparatus according to claim 1, wherein
the control unit is further configured to use environmental information regarding environments around the plurality of devices to determine the at least one output destination device.

16. The information processing apparatus according to claim 1, wherein
the control unit is further configured to use user information regarding the user carrying the plurality of devices to determine the at least one output destination device.

17. The information processing apparatus according to claim 16, wherein
the control unit determines the at least one output destination device on a basis of a learning result of learning the user information acquired when a tactile sensation is presented by the tactile presentation unit.

18. An information processing method comprising:
controlling output of a tactile signal, by an information processing apparatus, on a basis of content information regarding content presented to a user and device information regarding a plurality of devices that the user is carrying, each device of the plurality of devices having a tactile presentation unit configured to present tactile sensation to the user; and
determining, from among the plurality of devices, at least one output destination device having the tactile presentation unit to be an output destination of the tactile signal, on a basis of the content information and the device information,
wherein the output of the tactile signal is controlled in order to cause at least one output destination device of the plurality of devices having the tactile presentation units to make the tactile presentation unit of each output destination device present a tactile sensation corresponding to the content.

19. A non-transitory computer-readable recording medium having embodied thereon a program, which when executed by a computer causes the computer to execute a method, the method comprising:
controlling output of a tactile signal, on a basis of content information regarding content presented to a user and device information regarding a plurality of devices that the user is carrying, each device of the plurality of devices having a tactile presentation unit configured to present tactile sensation to the user; and
determining, from among the plurality of devices, at least one output destination device having the tactile presentation unit to be an output destination of the tactile signal, on a basis of the content information and the device information,
wherein the output of the tactile signal is controlled in order to cause at least one output destination device of the plurality of devices having the tactile presentation units to make the tactile presentation unit of each output destination device present a tactile sensation corresponding to the content.

\* \* \* \* \*